(12) United States Patent
DeFerranti et al.

(10) Patent No.: US 7,472,192 B2
(45) Date of Patent: Dec. 30, 2008

(54) COMMUNICATION SYSTEM AND METHOD FOR CONNECTING TO MULTIPLE ISP'S

(75) Inventors: Marcus DeFerranti, London (GB); Richard John Elliot, London (GB); Nigel Panter, Herne Bay (GB); Timothy Panter, Horsfield Bristol (GB)

(73) Assignee: Arbinet-thexchange Ltd., London (GB)

( * ) Notice: Subject to any disclaimer, the term of this patent is extended or adjusted under 35 U.S.C. 154(b) by 844 days.

(21) Appl. No.: 10/276,439

(22) PCT Filed: May 15, 2001

(86) PCT No.: PCT/GB01/02112

§ 371 (c)(1),
(2), (4) Date: May 27, 2003

(87) PCT Pub. No.: WO01/89142

PCT Pub. Date: Nov. 22, 2001

(65) Prior Publication Data

US 2003/0191841 A1    Oct. 9, 2003

Related U.S. Application Data

(60) Provisional application No. 60/204,341, filed on May 15, 2000.

(30) Foreign Application Priority Data

Nov. 17, 2000    (GB) .................................. 0028113.9

(51) Int. Cl.
*G06F 15/173* (2006.01)

(52) U.S. Cl. .......................... 709/226; 709/223; 709/224
(58) Field of Classification Search .................. 707/10; 709/223, 224, 226–228
See application file for complete search history.

(56) References Cited

U.S. PATENT DOCUMENTS

| | | | |
|---|---|---|---|
| 5,562,874 A | 10/1996 | Saad et al. | |
| 6,324,579 B1 * | 11/2001 | Bleuse et al. | 709/227 |
| 6,363,053 B1 * | 3/2002 | Schuster et al. | 370/230 |
| 6,636,502 B1 * | 10/2003 | Lager et al. | 370/352 |
| 6,665,702 B1 * | 12/2003 | Zisapel et al. | 718/105 |
| 6,704,795 B1 * | 3/2004 | Fernando et al. | 709/237 |
| 6,870,851 B1 * | 3/2005 | Leinwand et al. | 370/400 |
| 6,968,394 B1 * | 11/2005 | El-Rafie | 709/245 |
| 7,085,241 B1 * | 8/2006 | O'Neill et al. | 370/254 |

FOREIGN PATENT DOCUMENTS

| | | | |
|---|---|---|---|
| WO | WO 9911051 A1 * | 3/1999 | |
| WO | WO 00/14919 | * | 3/2000 |
| WO | WO 0014919 | * | 3/2000 |

* cited by examiner

*Primary Examiner*—William C Vaughn, Jr.
*Assistant Examiner*—Joiya M Cloud
(74) *Attorney, Agent, or Firm*—Wolf, Greenfield & Sacks, P.C.

(57) ABSTRACT

A communication system and method is disclosed for facilitating connection by a user to a selected one or more of multiple ISP's, thereby alleviating problems associated with providing a fixed link to a single ISP. Advantages may include ease of switching between ISP's and the system may enable a virtual ISP to be created having characteristics more suited to a user's need than the individual ISP's.

35 Claims, 10 Drawing Sheets

Fig.4.

Appendix 3: Process for buying IP capacity on the IP Trading Exchange

BAND-X. the bandwidth exchange.

| | Test your own hosts | Compare Sellers | Get a Quotation |
|---|---|---|---|
| Trading Walkthrough ||||
| This walkthrough is intended to help you to go through the various steps to choosing the right IP Service Provider for you and to navigate the Trading process leading to you being connected. ||||
| Steps to buying IP Capacity on Band-X Routed. ||||

Top FIVE Sellers for 2Mbps

| Rating | Seller | Quality Index | Price Index | Ratio |
|---|---|---|---|---|
| 1 | E | 85.68 | 1.19 | 72.13 |
| 2 | D | 53.64 | 1.11 | 48.41 |
| 3 | B | 45.53 | 1.00 | 45.53 |
| 4 | C | 50.30 | 1.12 | 44.89 |
| 5 | A | 47.14 | 1.26 | 37.27 |

| Geographical Zones |||
|---|---|---|
| US | UK | EU |
| 56.18 | 144.40 | 43.55 |
| 29.98 | 104.07 | 38.15 |
| 37.22 | 110.27 | 37.84 |

| Seller | US | UK | EU | ROW |
|---|---|---|---|---|
| A | 54.26 | 89.76 | 30.68 | 13.87 |
| B | 29.98 | 104.07 | 38.15 | 9.94 |
| C | 40.73 | 100.32 | 49.11 | 11.05 |
| D | 57.57 | 103.60 | 38.66 | 14.73 |
| E | 62.67 | 209.40 | 57.65 | 12.92 |

1 login to the site (you will have registered to see this walkthrough).
2 Check the Top 5 Quality/ Ratio table to pinpoint the best value offerings on the Exchange. This would indicate the best combinations of Quality and Price. Choose a seller of interest on the table and click on the letter.
3 Review the Quality Index rating in the zone(s) which best represent the profile of business you are interested in. Click on a time period (say 1 week) to view the consistency of the IP Service Provider on a graph.
4 Compare the Sellers line for Quality to that of the Peak and Average on the Exchange.
5 To investigate others, go back to home and click on Compare Sellers. This displays all the sellers in alphabetical order and their respective zone quality ratings. You can use this to choose the right profile for your market. You can click on the sellers direct on this table to investigate the graphs also.
6 To get into detailed testing of the sellers you will need to use the "test your own hosts" tool which allows you to input your own websites or IP addresses and test chosen sellers against each other.
7 When you have selected one, decide on the required port type and IP capacity desired.

| To obtain a quotation on a given IP Service Provider, drop down menus, then click 'Get quote'. ||
|---|---|
| Obtain a q ||
| Port speed | Committed ratio |
| 2Mbps | 1Mbps |
| Get quote ||

8 Click on 'Get quotation', choose the right dropdown menus to select your desired connection details.
9 The quote is returned with unique number, date and time stamp. If it's not right for you, back up and redo.
10 If quotation is suitable then you may click to "accept" it. This will alert a consultant on the Trading floor who will call you shortly.
11 Do you need a leased line to reach Band-X? If so would you like Band-X to assist you? (contact Band-X).
12 You will receive the Customer Order form which you will need to sign and return within 24 hours (by fax) to hold the quoted price.
13 You will be contacted by your Trading consultant to go through the technical parts of your connection - to confirm the full requirements.
14 Band-X Routed will then get your port ready for your access circuit to plug into. You will receive IP addresses if appropriate.
15 Band-X Routed engineers will configure the equipment and send out a router if appropriate.
16 We will request your IP addresses/ ASN to be announced by the appropriate IP Service Provider. They change their network filters to do this, we confirm when it is completed and then we notify you of the circuit in operation.
17 We will supply you with support documentation and your trading floor login is upgraded to "Buyer" status.

COMMUNICATION SYSTEM AND METHOD FOR CONNECTING TO MULTIPLE ISP'S

This application is the national stage under 35 U.S.C. § 371 of International Application No. PCT/GB01/02112 filed May 15, 2001, which claims priority to British Application No. GB 0028113.9 filed Nov. 17, 2000, which in turn claims priority to U.S. Provisional Application No. 60/204,341 filed May 15, 2000, all of which are incorporated herein by reference.

The present invention is concerned with communication, particularly but not exclusively facilitating connection to a distributed network such as the Internet. The invention is particularly, but not exclusively, concerned, with facilitating flexible connection of relatively high traffic users to the Internet.

A user connects to the internet using an Internet Service Provider (ISP). Generally, each ISP will provide several options to a user, low-speed connections for a low price, or higher speed connections for a higher price. The speed of a line is called the "bandwidth," usually measured in bits per second. The line quality of different ISP's may differ—even though two lines may be advertised as offering nominally the same bandwidth, the actual throughput on the lines of different ISP's may differ, and the error rate of the lines may differ.

Conventionally, a user selects a suitable ISP and contracts with the ISP to supply a connection for a fixed period of time, typically a year, and provides a physical link to the ISP. A problem with this arrangement is that the user may not be in a position to select the most appropriate ISP initially and even if a reasonable choice is made initially, the quality or value of service may fall over time and it is normally not straightforward to change ISP; leaving aside any contractual obligations, the technical problems associated with providing a new physical link and particularly changing ISP with live traffic are significant. Aspects of the invention aims to provide a more flexible way of facilitating connection, preferably relieving the technical problems of changing connections. Other aspects of the invention aim to facilitate selection of the most appropriate ISP initially and yet further aspects may enable a user to obtain a connection which is technically better and/or more cost effective than any offered by any one individual ISP.

By way of background, the sending of data over the internet will be briefly discussed. A large data file, for instance a picture, is sent over the internet in "packets." The large file is broken up into small chunks, each called a packet. The packets are sent to the destination. Each packet is handled independently by the network—the different packets of a message or file may each be routed to the destination over different paths between the sender and the receiver. When all the packets arrive at the destination, the recipient reassembles the original message. The rules for disassembling a message into packets, presenting them to the network, detecting failures and requesting that a packet be resent, receiving the packets and reassembling them message, etc. are collectively called the "internet protocol" or IP, a shortened form of Transport Control Protocol/Internet protocol or "TCP/IP."

SUMMARY OF THE INVENTION

In a first aspect, the invention provides a method of providing a connection to a distributed network for at least one user comprising:

(a) providing a connection centre;
(b) establishing a plurality of connections from the connection centre to a respective plurality of network service providers each providing a connection to the distributed network;
(c) storing a database of supplier parameters characterising each of the network service providers;
(d) providing at least some of said parameters in a form accessible to prospective users wishing to connect to the network;
(e) in response to a request from a requesting user to connect to the network using at least one network service provider selected from said plurality of network service providers, storing network service provider preference data specific to the requesting user;
(f) establishing a connection from the requesting user to the connection centre;
(g) storing routing data specific to the user based on the network service provider preference data;
(h) in the connection centre, routing network traffic between the requesting user and the distributed network via at least one of the network service providers based on the routing data specific to the requesting user whereby the requesting user becomes a connected user.

In this way, the user has an opportunity to review supplier parameters and select one and then make a connection to a convenient point rather than having to consider peripheral factors such as access points to the suppliers. In addition, based on the available parameters, the user may make a more informed choice between suppliers. Although a system could be implemented simply by providing hard wired access points to a plurality of providers, and this may be used to provide a workable but less advantageous development, the routing of traffic to the appropriate provider based on routing data specific to a user greatly facilitates configuration and reselection of providers and may facilitate provision of functions not possible with a hard-wired configuration. The information may be supplied to the user from a system independent from the routing system. In the case of a user who has already made a selection, steps (c) and (d) may be omitted. It is important to note that, while the seemingly logical method of connecting a user if multiple ISP's are available is to route over whatever routes are available, this is not what the invention provides; instead, routes are chosen selectively based on the routing data and this enables a user to obtain desired service characteristics, in particular to obtain desired price and/or performance criteria.

In a typical implementation steps (d) to (h) are repeated for a plurality of requesting users. The method may include providing a plurality of user connection points from which connections between the connection centre and respective ones of the plurality of requesting users can be established.

The method will normally permit modifying network service provider preference data stored for the or at least one connected user; this facilitates change of provider. In a preferred implementation the network service provider preference data is modified while the connected user remains connected to the distributed network via at least one of said selected network service providers. This is not possible with conventional hard wired connections which must be physically disrupted (unless two connections are maintained for a period of time, at increased cost and normally requiring additional connectivity at the user's site)

The connected user may initially be connected to the distributed network via only one network service provider. In the case where the user is initially connected to the distributed network via a first network service provider and following modifying the user is connected via a second network service provider, the method preferably comprises migrating network traffic from the first to the second network service provider and wherein during said migrating network traffic may be routed via either of said first and second network service providers; this maintains traffic and enables "live" switching between ISP's. This is facilitated by the provision of routing data; migrating may comprises modifying the routing data to open new routes associated with the second provider and then to close or de-prioritise (preferably over a period of time) routes via the first provider.

The network service provider preference data may include preference information for routing data via a plurality of said network service providers; this may provide flexibility not available with conventional systems. The network traffic typically comprises a plurality of classes of traffic and preferably different classes are preferentially routed via different network service providers. The classes of traffic may include at least two of non-real-time traffic (for example e-mail), real-time traffic (for example internet browsing traffic such as web pages) and time-critical traffic (for example streaming media such as video or audio).

The network traffic typically comprises traffic for different destinations in different regions and preferably traffic is preferentially routed via network service providers based on destination region. The destinations may be grouped into regions substantially geographically, preferably at least by continent, often by smaller regions, often based on network usage; typical groupings may comprise US, UK, EU and Rest of the World. Specialised sub groupings may be defined, for example if a user has or expects a large amount of traffic in a specific region. This may be advantageous as a provider with good quality in one region may provide less well in another region. The destinations may be grouped into regions based at least partially on the network topology of one or more of the network service providers.

The preference information may identify primary and back-up network service providers; this may enable a more cost-effective or higher quality supplier to be used for most traffic but ensure that service is still provided in the event of failure of that provider. Automatic provision for back-up service may be provided and a priority list, optionally defaulting to any available provider may be specified.

The preference information may include timing schedule information and the traffic may be preferentially routed to a selected network service provider based on the time at which the traffic is sent. Certain providers may offer a better service at some times of day than others, for example during the working day in a particular country service may be worse than in the evenings or late at night or at weekends or vice versa. The timing schedule information may identify preferences based on the time of day and/or the day of the week. In particular, where some suppliers have an extensive backbone in a particular country, for example the US, performance may vary as a function of local time where the backbone is located.

The supplier parameters may be supplied, for example by the provider. However, most preferably the method comprises determining at least some of said supplier parameters. This may enable an independent assessment of different providers and facilitate more reliable objective comparison. The supplier parameters may be based both on received parameters provided by the network service providers and determined parameters independently determined. Some parameters may be better obtained directly from the supplier. For example, the received parameters may include a measure of cost of connection, preferably obtained as a cost schedule from the supplier, preferably in machine readable form, preferably communicated directly into the database. The determined parameters preferably include a measure of connection quality.

The measure of connection quality includes a measure of at least one factor from the group consisting of throughput, number of hops required to reach a given destination, packet loss and round-trip time to and from a given destination. The measure of connection quality may be based on all of said factors. Most advantageously, the measure of quality comprises a quality index figure based on a weighted combination of a plurality of said factors; this may enable even a relatively unsophisticated user to determine rapidly which is a better supplier. Further preferred features of the determination of quality are discussed below. The measure of quality is preferably based on testing the performance of each network service provider for a plurality of network destinations; this can minimise the risk of anomalous results due to variations in the quality of a network and may give a more reliable reflection of actual quality. Preferably a plurality of measures of quality are determined for a plurality of different geographical regional destinations.

The measure of quality for each network service provider is preferably based on data received from a dedicated network statistics collector coupled to the network service provider's network; this facilitates reliable gathering of data. The method may comprise providing said dedicated network statistics collector. The method may further comprise receiving statistics from a plurality of network statistics collectors at a statistics server and compiling a quality index. Preferably the quality index is based on substantially continuous testing of each network service provider's network; this enables changes in performance and/or daily/hourly/weekly trends to be detected and facilitates making of regular informed choices by users. Most preferably a quality/cost ratio is determined.

In a preferred implementation, step (d) comprises making the supplier parameters available to prospective users over said distributed network (typically the Internet). The supplier parameters are preferably made available in a form enabling a prospective user to request service from one or more network service providers based on the supplier parameters over the distributed network. This facilitates updating and choosing of providers.

Preferably the method includes providing a means of secure access, preferably comprising maintaining a status database and providing at least one connected user with an identifier and password, to enable the connected user to request a change in the network service provider preference data, the method further comprising modifying routing automatically in response to said modification. This facilitates rapid changing of providers by users.

The method advantageously includes generating billing information for the or each connected user and/or generating usage information for the or each network service provider.

In preferred implementations, the connection centre comprises a plurality of interconnected routing devices. The routing devices typically comprise autonomous systems (AS). The communication centre may comprise an autonomous system having a set of IP addresses and wherein traffic is passed substantially transparently through the connection centre between users and network service providers.

In a most preferred implementation, the connection centre comprises at least a first routing device coupled to at least first and second network service providers and coupled to at least first and second users, the first routing device having a first route server for maintaining a list of available routes from the first routing device to points in the distributed network via the at least first and second network service providers, wherein the first routing device is arranged to make available a first subset of the available routes to the first user and a second subset of the available routes to the second user, each subset being selected on the basis of the network service provider preference data for the respective user.

This may be provided independently in a closely related but independent second aspect in which the invention provides a method of connecting at least first and second users to at least first and second network service providers each providing access to a distributed network via at least a first routing device provided in a connection centre, the first routing device having a first route server for maintaining a list of available routes from the routing device to points in the distributed network via the at least first and second network service providers, the method comprising storing network service provider preference information for each of the first and second users and making available a first subset of the available routes to the first user and a second subset of the available routes to the second user, each subset being selected on the basis of the network service provider preference data for the respective user.

The routing device may comprise a switch. In an implementation, the first and second users are each connected to the switch via respective first and second user routers, wherein the first and second network service providers are each connected to the switch via respective first and second provider routers and wherein the switch is arranged to provide a first Virtual Private Network (VPN) connection between the first user router and at least one first target router selected from said provider routers based on network service provider preference data for the first user and to provide a second Virtual Private Network (VPN) connection between the second user router and at least one second target router selected from said provider routers based on network service provider preference data for the second user. The method may include storing first and second routing table information respectively for the first and second users and wherein the first user router is supplied with first routing table information and wherein the second user router is supplied with second routing table information.

Alternatively, the routing device may comprise a router. At least one user may be coupled to the router via a switch.

Typically at least one of the network service providers may be coupled to the first routing device via a second routing device provided in the connection centre. At least one of the users may be coupled to the first routing device by a further routing device provided in the connection centre. The first routing device may be connected directly to at least one network service provider. At least one user may be coupled to the first routing device via a switch. Typically, the or each routing device employs BGP (border gateway protocol) to communicate available routes and the routing device is configured not to communicate all available routes to all users but to maintain separate lists of available routes for each user.

The network service provider preference data may comprise a list containing one or more specified network service providers; this enables a user to specify directly which provider they wish to use (although the providers may be anonymous).

Alternatively (or in addition—for example where classes of traffic are defined, specific providers may be specified for certain classes and criteria specified for others, or a first choice specific provider may be specified followed by criteria if the specific provider has a fault or fails to meet a specified (price or quality) condition) the network service provider preference data may comprise a list containing one or more selection criteria and wherein the method further comprises selecting one or more appropriate network service providers or determining the routing data based on the selection criteria and said supplier parameters. The method may further comprise automatically reselecting the appropriate network service provider(s) or re-determining the routing data following a change in the supplier parameters. The method may include communicating at least one of the selected network service provider(s) or a change therein or a change in supplier parameters to the user.

The network service providers may be identified to a user by means of a tag (for example a numerical or alphabetical index number) without revealing the full identity of the network service provider. This facilitates competition based on technical quality, leading to a more efficient network overall.

In a closely related but independent third aspect the invention provides a method of providing a virtual network service provider providing access to a distributed network, the method comprising:
  providing a connection centre;
  providing connections from the connection centre to a plurality of network service providers each providing access to the distributed network;
  providing at least one user connection;
  storing a database of supplier parameters characterising each of the network service providers;
  storing network service provider selection criteria;
  determining routing information based on the selection criteria and the supplier parameters;
  routing traffic from the user connection to the distributed network via one or more selected network service providers based on the routing information.

Preferably the routing information comprising a subset of all routes available at the connection centre via all network service providers. Rather than simply using all routes, as might be considered to be optimum, a selection is made to give a desired characteristic in terms of price and performance. A plurality of virtual network service providers may be defined or a plurality of service classes are defined having mutually different selection criteria. Selection criteria typically differing between the plurality include cost of service and/or quality of service. User-specified selection criteria may be used for at least one connection; this may enable a user to "create" a virtual ISP having the best characteristics for the user's needs chosen from available ISP's. The traffic may advantageously be classified into subsets of traffic having different characteristics and routing information may be assigned to each subset whereby different subsets may be routed differently. The characteristics may include one or more of traffic type or urgency (for example email or streaming video), geographical destination, time of day or burst rate. For example a user who sends a lot of streaming video in the US and sends a lot of mail to Europe may select an ISP with good performance for real time transfer in the US, a cheaper ISP for real time video to elsewhere and the cheapest available provider for email.

Advantageous features and sub features of all methods may be applied to other methods, unless otherwise expressly stated or implicit from the context.

As noted above, in a preferred implementation, the network comprises the Internet and each network service providers comprises an ISP.

The invention extends to a computer program or computer program product containing instructions for use in carrying out a method step corresponding to any of the steps of the first aspect or any of the advantageous features mentioned above or below or any combination.

The invention also extends to corresponding apparatus, including but not limited to components, systems and configured routing devices and advantageous features of the method may be applied to features of the apparatus.

In a first apparatus aspect, the invention provides a system for providing a connection to a distributed network for at least one user arranged for installation in a communication centre, the system comprising:

means for connecting to a plurality of network service providers each providing a connection to the distributed network;

means for storing a database of supplier parameters characterising each of the network service providers;

means for providing at least some of said parameters in a form accessible to prospective users wishing to connect to the network;

means for storing network service provider preference data specific to a requesting user in response to a request from the requesting user to connect to the network using at least one network service provider selected from said plurality of network service providers;

means for connecting to the requesting user;

means for storing routing data specific to the user based on the network service provider preference data;

means for routing network traffic between the requesting user and the distributed network via at least one of the network service providers based on the routing data specific to the requesting user whereby the requesting user becomes a connected user.

In a second apparatus aspect, the invention provides a system for connecting at least first and second users to at least first and second network service providers each providing access to a distributed network via at least a first routing device provided in a connection centre, the first routing device having a first route server for maintaining a list of available routes from the routing device to points in the distributed network via the at least first and second network service providers, the system comprising means for storing network service provider preference information for each of the first and second users and means for making available a first subset of the available routes to the first user and a second subset of the available routes to the second user, each subset being selected on the basis of the network service provider preference data for the respective user.

In a third apparatus aspect, the invention provides a system for providing a virtual network service provider providing access to a distributed network, the system comprising at a connection centre:

connections from the connection centre to a plurality of network service providers each providing access to the distributed network;

at least one user connection;

a database of supplier parameters characterising each of the network service providers;

means for storing network service provider selection criteria;

means for determining routing information based on the selection criteria and the supplier parameters;

means for routing traffic from the user connection to the distributed network via one or more selected network service providers based on the routing information.

In a fourth apparatus aspect, closely related to the first apparatus aspect, the invention provides a system for providing a connection to a distributed network for at least one user arranged for installation in a communication centre, the system comprising:

at least a first routing device for connecting to a plurality of network service providers each providing a connection to the distributed network;

a first memory area storing a database of supplier parameters characterising each of the network service providers;

a processor for providing at least some of said parameters in a form accessible to prospective users wishing to connect to the network;

a second memory area storing network service provider preference data specific to a requesting user in response to a request from the requesting user to connect to the network using at least one network service provider selected from said plurality of network service providers;

a user port for connecting to the requesting user;

a third memory area storing routing data specific to the user based on the network service provider preference data;

wherein the routing device is configured to route network traffic between the requesting user and the distributed network via at least one of the network service providers based on the routing data specific to the requesting user.

In systems and methods according to the invention, although preferably components are provided at a single site, further sites may be connected to facilitate access and/or the connection centre may comprise interconnected routing devices at geographically spaced apart physical locations. For a user who has selected a network service provider, method steps (c) and (d) (and corresponding apparatus features may be omitted.

The invention further provides a method, comprising the steps of:

providing access to a plurality of IP carriers;

providing a user-operable interface to customers by which a customer may connect to one of the IP carriers at the choice of the customer.

The invention further provides a method, comprising the steps of:

monitoring the quality of a plurality of internet paths using a metric, each path being routed on the lines of a single IP carrier;

evaluating the quality of a plurality of IP carriers by formulating a comparative metric.

The invention further provides a method, comprising the steps of:

monitoring the quality of two or more internet paths using a plurality of metrics;

combining the metrics to form a combination metric indicative of the relative quality of the two paths.

In the foregoing, reference is made to routing traffic and to routing devices. The routing devices are in one preferred implementation routers (which will normally be BGP capable). However, the routing devices may comprise other devices capable of routing traffic for example, a switch. In particular, if the users have routers included in their own networks, these may be coupled directly to a switch. Such user routers will normally be configured to be part of the Autonomous System (AS) provided by the communication centre. If the users do not have routers which are suitable to connect directly to the switch, a router may be provided to which the user is connected.

When multiple users are connected to multiple network service providers, optionally in accordance with any of the preceding aspects, it has been found desirable to provide a mechanism for managing connections and billing of usage, particularly when users change providers and the mechanism should ideally cope with both users' and providers' requirements and also to avoid network traffic problems caused by constantly fluctuating selection of providers. In particular, since different users may connect at different rates, it would become cumbersome for a network service provider to manage this information, particularly as the users may change regularly.

In accordance with any preceding aspect, or as an independent feature, the invention may provide inhibiting a request to change network service provider for a period after initial connection to a provider.

In a further aspect, the invention provides a method of providing connections from a plurality of users to a plurality of network service providers, the method comprising:
(a) receiving a request from a first user to connect to a selected network service provider at a selected tariff;
(b) providing a connection from the first user to the selected network service provider;
(c) storing the selected tariff for the first user as selected tariff information;
(d) setting a validity period for the selected tariff for the first user;
(e) receiving, at intervals, updated tariff information from the selected network service provider;
(f) during the validity period, generating billing information for the user based on the selected tariff information;.
(g) after the validity period, generating billing information for the user based on the updated tariff information.

With such an arrangement, a user can connect initially at an agreed rate for a period of time, preferably at least a couple of weeks, ideally at least 28 days, typically 30 days after initial connection. This provides the user with knowledge that the rate will not unexpectedly increase and the network service provider has a guaranteed service period. Preferably the method includes responding to a request to change network service provider only after the validity period.

The method may include notifying the user when the updated tariff information changes, particularly in response to a price increase.

Advantageously step (g) comprises, in the event that the updated tariff information indicates an increased tariff compared to the tariff at which the user is being billed, carrying out the following steps:
storing the tariff at which the user is being billed as old tariff information;
setting an acceptance period;
during the acceptance period, generating billing information for the user based on the old tariff information;
after the acceptance period, generating billing information for the user based on the updated tariff information.

This may allow a user to have time to change supplier in the event that a provider increases tariffs.

Advantageously step (g) comprises, in the event that the updated tariff information indicates a reduced tariff compared to the tariff at which the user is being billed, generating billing information for the user based on the updated tariff. This may allow a user to take advantage rapidly of a reduction in tariff.

Preferably billing information is generated based on billing intervals, preferably at daily intervals. This may simplify billing calculation and overhead greatly. Preferably the validity period is an integral number of billing intervals, preferably at least 28 days. Preferably the acceptance period is an integral number of billing intervals, preferably at least 7 days, ideally 14 days and ideally at least two days longer than the migration period mentioned below. In the case of a reduction, the updated tariff is preferably applied from the next billing interval but may be applied only after a specified number of billing intervals.

The method may include receiving a request from a user to connect instead to a second selected network service provider at a second selected tariff, the method comprising:
storing the tariff at which the user is being billed as first provider tariff information;
storing the second selected tariff as second provider tariff information;
migrating user traffic from the first network service provider to the second network service provider;
setting a migration period;
during the migration period, generating billing information for the user based on the first provider tariff information;
after the migration period, generating billing information for the user based on the second provider tariff information.

Such a feature allows a user to change seamlessly from one supplier to another. It will be noted that billing is based on the old supplier during the change. This means that the new supplier may not be paid for a brief period while traffic is being acquired; however, since the new supplier is gaining a customer, this may be acceptable and overall, since a supplier will get paid for a brief period after traffic has migrated away, the net effect should balance out. An important feature which may be provided independently is the generation of billing information for users and/or suppliers independently of actual traffic flow. Surprisingly, this may have the benefits of simplifying analysis of traffic, providing better network traffic routing and providing benefits for both suppliers and users.

The method may include setting a second validity period, during the second validity period, generating billing information for the user based on the second provider tariff information and after the second validity period, generating billing information for the user based on updated tariff information received from the second network service provider. Similarly, the principles of a fixed period following a change may be applied to subsequent changes.

The method may include monitoring traffic to confirm that all traffic has migrated to the second selected service provider during the migration period. The migration period is preferably set to be longer than the time required for migration of network service provider to propagate over the network (typically about 3 days for the Internet), preferably at a fixed period, preferably 7 days.

The method will normally comprise repeating at least steps (a) to (g) for at least a second user and normally for a plurality of users.

The method may further comprise generating total payment information for each network service provider based on tariffs applied to each user. This may obviate the need for monitoring of individual usage by each network service provider.

In a further aspect, the invention provides a method of generating billing information for a network service provider wherein a plurality of users are connected to the network service provider, the method comprising:
receiving regularly updated tariff information from the network service provider;
storing for each user applicable tariff information based on the regularly updated tariff information;
storing for each user connection information;
generating billing information for the network service provider based on the applicable tariff information and connection information for each user.

This may allow multiple users to connect at different tariffs, typically for fixed initial periods (for example in accordance with the preceding aspect) and appropriate billing information be generated for each network service provider, who need not and cannot easily identify traffic and associate it with each user. The method is typically performed for each of a plurality of network service providers at a connection centre by means of which the plurality of users are connected to the plurality of network service providers. The method is most advantageous in implementations wherein connections between users and network service providers are permitted to change, optionally after a fixed tie-in period of the order of a month or so following an initial connection and/or subject to certain constraints. Advantageously, during a change of connection for a changing user from a first network service provider to a second network service provider, network traffic for the changing user is permitted to flow via both the first and second network service providers but billing information is generated based on only one of said first and second network service providers, preferably the first network service provider.

In preferred implementations, billing information is based on agreed bandwidth. The method may include monitoring actual bandwidth for each user. The method may further comprise permitting actual bandwidth to exceed agreed bandwidth by a predetermined factor, preferably a factor of 2. The method may further comprise generating billing information to bill a user at a higher rate if actual bandwidth exceeds agreed bandwidth according to a predetermined condition, preferably if more than 5% of traffic is at a higher bandwidth than the agreed bandwidth in any billing interval.

It is to be noted that the methods including generating billing information are particularly advantageous in the environment provided by aspects of the invention and may be used to generate information directly associated with updated connection and tariff information in a manner which cannot readily be achieved by conventional systems in which suppliers bill end users directly and provides technical benefits in reduction of amount of data to be processed by each supplier for greater usage volumes.

The important feature of route selection or inhibition mentioned herein may be provided independently or as a preferably feature of other aspects. For example, the invention may proved a routing device in a connection centre coupled to a plurality of network service providers providing a plurality of routes to a destination, the routing device being coupled to a user, the routing device having route inhibiting means for inhibiting traffic from the user destined for the destination from passing via at least one of the routes. The means for inhibiting may comprises a routing table provided to the user, the routing table excluding said at least one of the routes. The means for inhibiting may be configured based on network service provider preferences specified by the user.

Other aspects and preferred features are set out in the claims and/or below. In the following description of a preferred embodiment, features may be provided independently of other features as preferred features or further aspects, unless otherwise expressly stated or clearly required by the context.

Attributes, advantages and features stated are of representative embodiments only. Additional features and advantages of the invention will become apparent in the following description, from the drawings, and from the claims.

DESCRIPTION OF THE DRAWINGS

An embodiment of the invention will now be described by way of example only with reference to the accompanying drawings in which:

FIG. 4 shows a display of information giving an overview of a method of connecting to the Internet in accordance with an embodiment of the invention;

DESCRIPTION

Figure 1:
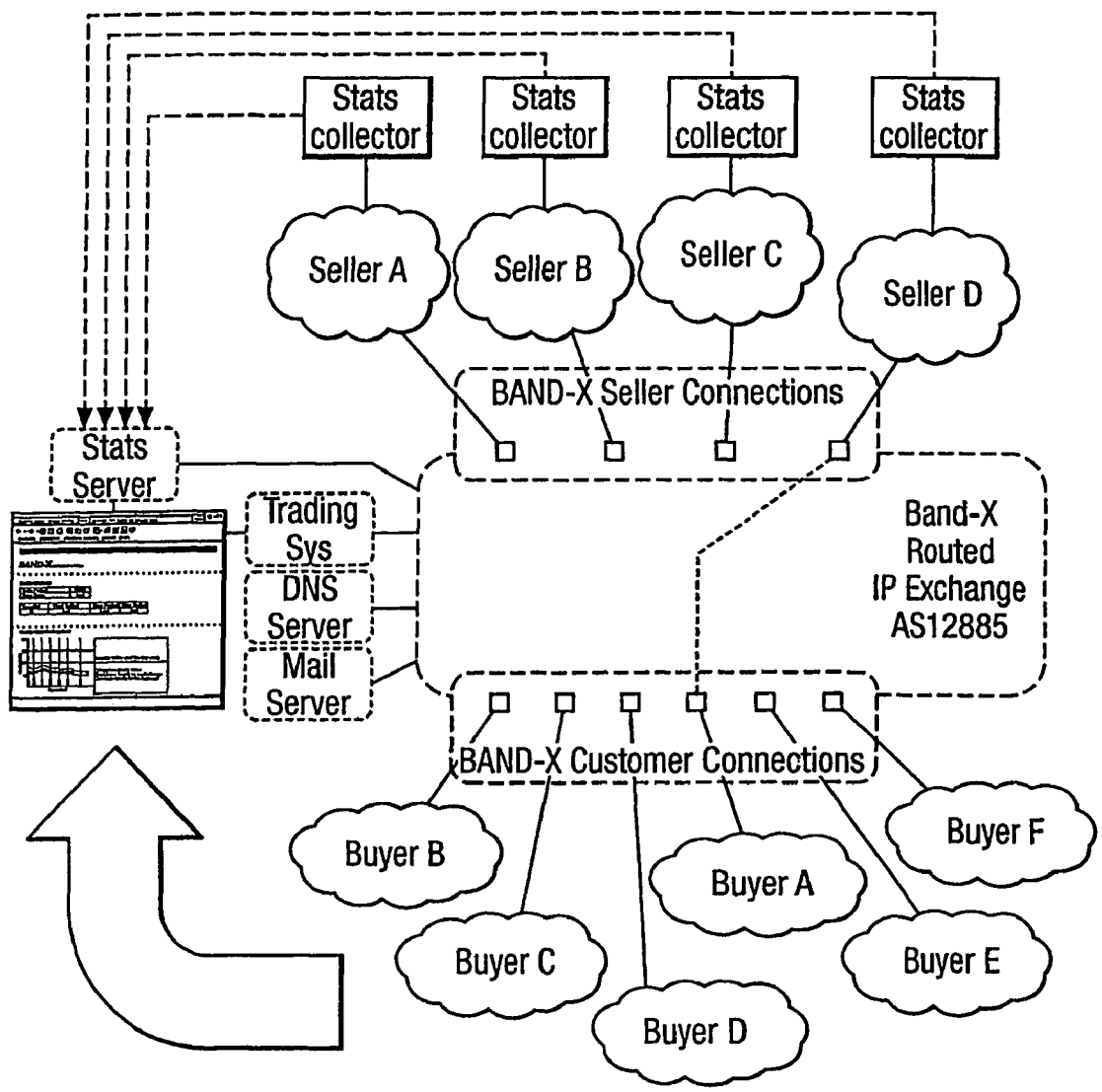
FIG. 1 shows a schematic diagram of a complete system embodying the invention.

Referring to FIG. 1, the IP Exchange provides a forum, analogous to a securities exchange, in which buyers and sellers may trade IP capacity. This IP Exchange concept is embodied in an internet web centric IP Trading floor. The IP Exchange uses technology originally developed for network edge management to build a virtual private network, which can serve as a single virtual exchange entity. One embodiment of the IP Exchange is available at www.band-x.com, all of whose pages are incorporated herein by reference.

In the embodiment of FIG. 1, the IP Exchange may be implemented as a connecting point between all sellers and all buyers. The IP Exchange functions as a single large router, a gateway between buyers' IP traffic and sellers' capacity. To the sellers, the IP Exchange appears to be a single router in the overall internet, a single node at the edge of the seller's network. To buyers, the IP Exchange appears to be one of the hops internal to the internet. A physical connection connects the buyers' hardware with the IP Exchange hardware. Internal to the Exchange, IP traffic is routed to the correct buyer or seller, according to the IP carrier that the buyer has chosen.

A server (as used herein, the term server may refer to a single server or, more commonly, a cluster of servers which will normally be at the same location but may be distributed; unless specifically stated otherwise, references to a server are intended to encompass clusters of servers) operated by the IP Exchange hosts a web site at which sellers may offer IP capacity, and buyers may observe and compare the competing offerings and contract with a specific seller. This server, called the IP Exchange Operations Management Centre (XOMC), is the place where the systems and the routing and switching hardware are all monitored and controlled, and from where the faults are fixed or co-ordinated.

The principles behind the facilities bases IP Trading Exchange are as follows:

- A connecting point for many Sellers who wish to sell wholesale IP Capacity (sometimes known as "transit")
- Ability for a buyer to select an IP Service Provider/seller based on independent real time web-based Quality and Price analysis
- Ability for buyer to change their IP Service Provider to another on the IP Exchange at a suitable interval, e.g. monthly, weekly, daily
- Constant competitive pricing achieved through the market dynamic of Sellers offering ever changing prices for IP capacity
- A simple, open and objective way to buy or sell IP capacity The developing liquidity of IP Trading resulting in the establishment of a true financial market commodity in which to trade Trading Systems FIG. 4 provides a walkthrough of the trading process, showing a conversation between a buyer and the IP Exchange. After the buyer logs into the system, the buyer is presented with a number of capacity, quality, and cost factors. The buyer may request a quote for a specific level of service from a specific vendor. In the example, the vendors are given an anonymous names A through G—another part of the web site gives a list of the actual sellers, but the anonymity of the association between actual sellers and actual price quotes is maintained. In other embodiments, this information may be disclosed. The buyer may accept or reject the quote.

The IP Exchange allows a seller to set his prices and change them anytime by simply using a web browser and going through an authorisation process. This is allows a seller to adjust to changing market conditions. Only rarely can a seller instantaneously engineer changes in his network that would spark significant differences in the network's quality. However in amending the prices, the ratio of quality to price can make a significant difference.

The IP Exchange provides a top 5 table for IP service providers to enable buyers to compare at a glance, the relative value proposition. Hence the price variations can be used to manipulate the position within this table.

Acceptance of Quotes

As a result of the fluid nature of the prices, it is important for prospective buyers to gain a quote that is valid. A moment after the quote was requested new prices could be submitted to the web by the seller. The IP Exchange maintains a seller's price for a fixed period, typically a month. This may be enforced by only allowing the seller to change his price at most once a month (or at other suitable intervals). In another alternative, a seller may change his prices arbitrarily often, but all price quotes given to buyers will remain binding for a fixed period, typically one month, even if the seller has changed price in the interim. Similarly, buyers may be bound to a fixed period, typically one month minimum at the rate accepted. To track this, the trading system date and time stamps any quotation, and provides a unique identifying number. This provides an auditable trail, should the web based quote acceptance be questioned later by the IP Service Provider.

The acceptance of a price quote kicks off the process for ordering IP capacity. It can be completed through traditional paper means or through an electronic process, all the way through to financial transaction.

Flexibility

The IP Exchange may allow a seller to change between IP Service providers for the buyer's IP capacity. With many Sellers appearing on the IP Exchange, changing from one to another seller is made easier. As in the initial purchase of IP Capacity, buyers would browse the web and confirm their choice by accepting a new Seller. This can then be activated through manual or automatic means to instigate the change.

Neutrality

The IP Exchange takes a flat rate commission straight from the seller for all bandwidth sales. This enhances the neutrality of the IP Exchange in that it does not favour any seller over another due to negotiated differences in commissions. In an alternate model, both buyer and seller may be charged.

Multiple Exchanges can be set up in different cities around the world. In some cases, it will be preferred that the multiple Exchanges not be connected together. Because market conditions will likely vary from market to market, and the physical connections are geographically based, separation of the markets will negate arbitrage of IP capacity across geographically distinct (and therefore non-interchangeable) markets.

IP Exchange Facilities

The IP Exchange is operated as a facilities-based business rather than an agency based trading function. This facilitates flexibility of the buyer's choice among ISP's and reduces legal entanglements with the seller.

A Basic Embodiment

The IP Exchange is arranged to appear to the buyer like the Sellers network independent of any other session at a the time, and to the seller like a single high usage customer communicating using border gateway protocols, currently BGP4. The hardware is also arranged to reduce the dependency of a buyer on any single ISP, to deliver high performance with a low failure rate. It is desirable that a design scale well, to meet increased use in a specific locality, and to enable use of the IP Exchange technology in many locations throughout a large city or world-wide.

Figure 2:
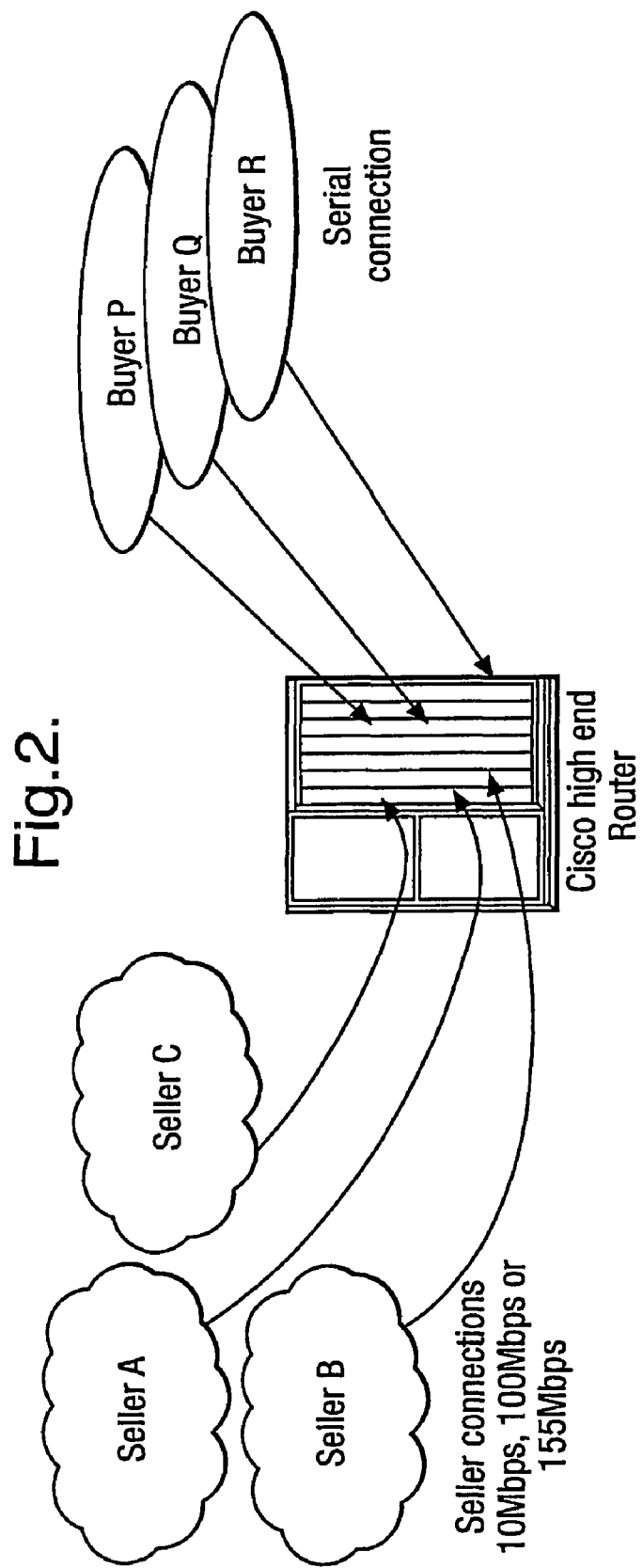
FIG. 2 shows a schematic diagram of a simplified system embodying the invention.

Referring to FIG. 2, a Cisco 75xx router performs most of the functions needed to run the IP Exchange on a small scale. This implementation may be suitable for 2 or 3 IP Service Providers to connect onto as sellers. The router may support many interface types—Ethernet, ATM, and Serial based interfaces. This simple architecture need only use internal and external BGP4 to announce routes of a buyer to a particular seller. The routing would set up as policy based routing between a source a destination port in conjunction with the BGP announcements so that the correct service provider was able to see the traffic only from the buyer who is requesting that IP Service Provider.

The core router has BGP4 sessions with the three Seller networks. Normally, the router would be programmed to take the best path to a certain destination, and the router develops a single routing table to be shared among all packets that arrive at the router. In contrast, in the IP Exchange router, each seller network has its own routing table of around 100,000 routes (this is the current full routing table of the internet). Packets are routed onto the correct ISP by using the routing table corresponding to the buyer's selected ISP. The routing tables will differ slightly, each tailored to the particular seller's network—and so these routing tables are kept distinct on the router.

The IP Exchange obtained an Autonomous System number and blocks of IP addresses from the appropriate IP Address body. The IP Exchange can therefore communicate using BGP to neighbouring networks, and announce any buyer's IP address block (even if that buyer has an IP address of its own, outside the block of addresses reserved by the IP Exchange) to the adjacent IP Service Provider networks. ("BGP" is an acronym for "Border Gateway Protocol," described at http://www.cisco.com/univercd/cc/td/doc/cisintwk/ito_doc/bg-p.htm, which, along with pages referenced either directly or indirectly, by hyperlink or otherwise, is incorporated herein by reference.) The fact that the IP Exchange can allocate an IP Address range to the buyer (instead of the traditional model of the IP Service Provider allocating them addresses directly) means that the buyer is no longer tied to one Service Provider since his block of addresses are routable independently (Class C blocks of 256 addresses minimum)

Buyers physically connect to the IP exchange with their chosen type of interface. These may include anything from around 1 Mbps to OC3 and beyond, typically, the connections are 100BaseT Fast Ethernet or serial from as low as 2 Mbps (E1).

Sellers, likewise connect to the IP Trading Exchange with their chosen interface. Seller connections are typically 100BaseT to run 100 Mbps, or OC3 (155 Mbps), OC12 (622 Mbps) or Gigabit Ethernet (1000 Mbps).

A Higher-Capacity Embodiment

Figure 3:
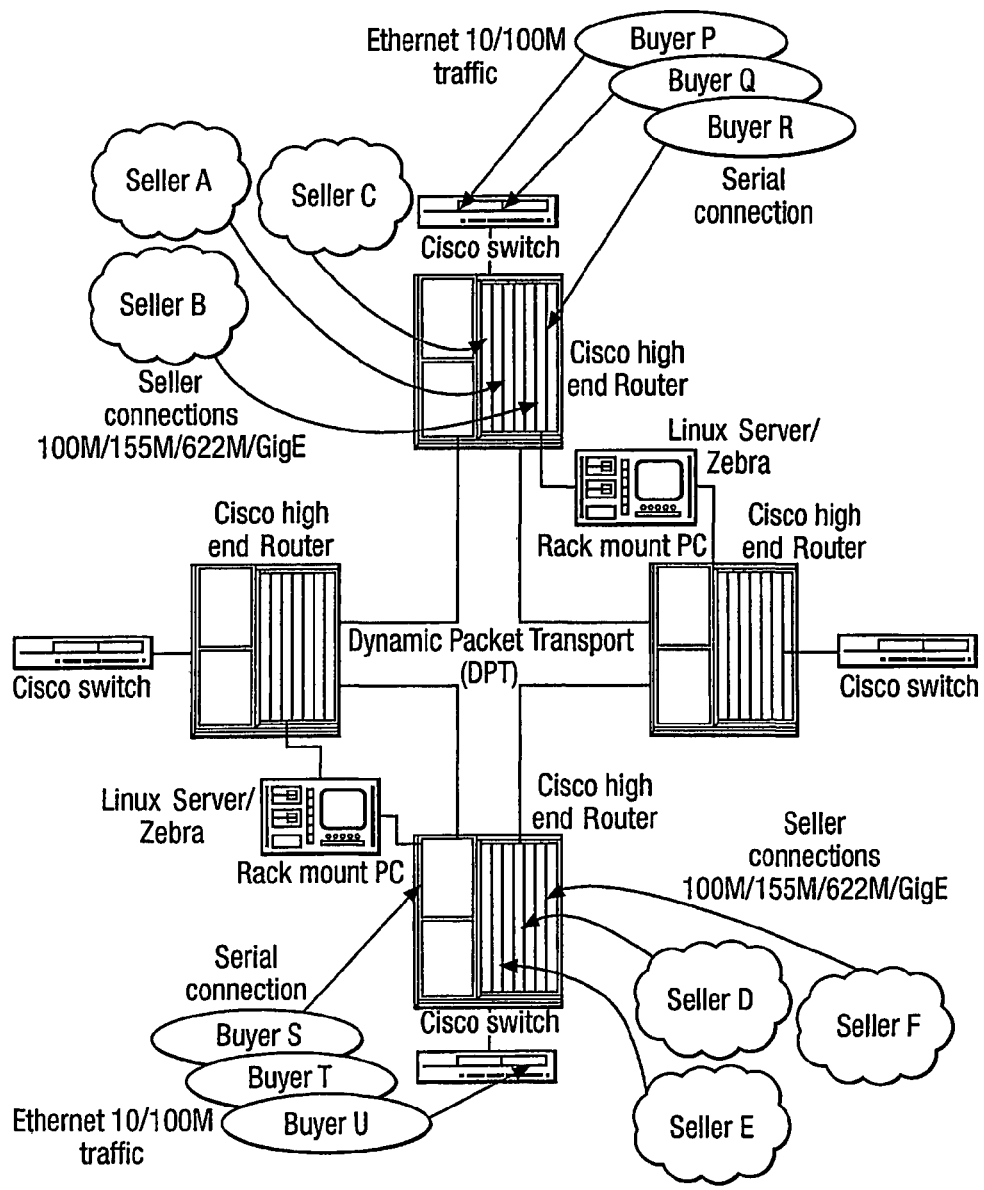
FIG. 3 shows a schematic diagram of a scalable system embodying the invention.

Referring to FIG. 3, a number of routers may be combined to provide the capability of one large router interfacing the buyers to the sellers. The multiple routers may be connected in a resilient ring or other network topology. In one embodiment, multiple Cisco75XX routers are combined using Cisco's Dynamic Packet Transport DPT technology. The ring architecture can be achieved in a similar way to the operation of FDDI, using Cisco new proprietary, Dynamic Packet Transport (DPT) technology over high speed of OC12 or 622 Mbps connections. DPT allows for traffic to bypass routers without hitting the backplane of the router, thereby increasing performance and scalability. The implementation of FIG. 3 may use series 72xx, series 75xx, series 100xx and series 120xx routers from Cisco. Other router equipment can also be used, especially those that provide multiple VRF's. For instance, the new operating system software JUNOS from Juniper is expected to provide this capability. Juniper M20 or M40 high end routers would likely be connected by high speed serial or Gig Ethernet. The configuration of FIG. 3 yields a more scalable implementation, with less blocking of packets. The configuration of FIG. 3 may also allow upgrades on some parts of equipment to have minimum impact on others.

The buyer should receive the selected seller's routing table in its entirety and not a subset based on its best routes. This can be achieved using Cisco's Provider Edge (PE) Virtual Private Network (VPN) Routing and Forwarding capabilities. This is known as a VRF (VPN Routing and Forwarding). The PE feature of the MPLS (Multi Protocol Label Switching) feature of the Cisco 7xxx series routers allows a single router to support multiple BGP4 routing tables To connect more than one buyer of this nature to the same router, several VRF's are operated on the same Router. Using DPT to interconnect the multiple routers enables high speed transfer of data between the core routers of the IP Exchange without losing the MPLS and the provider edge functionality. The Cisco 75xx is the largest core router that Cisco currently have supporting multiple VRF's. However this will also change in a few months, so as equipment and software develop the physical topology of the IP Exchange may vary, but the principles remain the same. The use of multiple routing tables may be achieved using Cisco's MPLS support and assigning a BGP table to each VPN. In this way, a given buyer can be given full access to a particular IP Service Provider's Internet Routes without it affecting other buyers receiving their different set of routes from a different BGP Routing Table.

The ranges of Cisco and Juniper routers both support Multi Protocol Label Switching (MPLS) for operating VLAN and Virtual Private Networking (VPN) across various hardware forming the IP Exchange. It is noted, however, that Cisco Provider Edge technology may not be fully supported on other hardware, such as the Juniper hardware.

The core of the IP Exchange operates extremely fast—faster than a significant multiple of the fastest standard input interfaces put together.

MPLS, with its PE and VPN features, is described at the following web sites, which (along with all pages referenced either directly or indirectly, by hyperlink or otherwise) are incorporated herein by reference.

http://www.cisco.com/univercd/cc/td/doc/product/rtrmgmt/vpnsc/mpls/1_1/user_gd/vpn_ug b.htm http://www.cisco.com/univercd/cc/td/doc/product/rtrmgmt/vpnsc/mpls/1_1/user_gd/vpn_ug 1.htm http://sunsite.auc.dk/RFC/rfc/rfc1930.html http://www.isoc.org/ftp/rfc/1700/rfc1786.txt http://www.cisco.com/univercd/cc/td/doc/product/software/ios120/120newft/120limit/120s/120s5/mpls_te.htm http://www.mplsrc.com/ http://www.cisco.com/warp/customer/784/packet/july99/26.html http://www.cisco.com/univercd/cc/td/doc/product/software/ios120/120newft/120limit/120s/s rpapsgs.htm In another embodiment, the core can be a switching architecture (see FIGS. 9 and 11) such as a Cisco 6509. This enables buyers to connect using Ethernet, Fast Ethernet or Gigabit Ethernet to the high speed core.

Buyer with no Autonomous System Number

A buyer having chosen their IP Service Provider and signing the agreement with the IP Exchange, connects its network on to the Router using a serial or Ethernet port, and is allocated an IP address block (e.g., class c) by the IP Exchange, not by the IP Service Provider. These IP addresses are then routable through any of the Sellers who connect to the IP Exchange, and not just one ISP as in the traditional situation.

Each buyer connects to the IP Exchange with a router (size dependent on the capacity required, but this may be as small a router as a Cisco 2610) which is assigned a dummy AS (Autonomous System) number. This AS number is not compatible with the generic Internet and is only used to announce its routes using internal BGP (IBGP) to the central main Core Router. The core router then forwards the traffic to the appropriate Seller network over the established BGP session with that network (an eBGP session). In another embodiment, MPLS may be used to provide a secure VPN for the buyer port, and this is included in the Seller's VPN, with Routes served from the Route Server. An alternative embodiment may use VLANs into which buyer and seller ports are included. A BGP route table is served to the buyer route.

The IP exchange announces the buyer's IP address block only to the selected Seller network. In this way the seller does not 'see' other buyers connected to the IP Exchange and return traffic still travels across the correct network.

When the buyer wants to change IP Service Providers on the IP Exchange, the buyer makes his choice on the IP Exchange web site (with minor variations, following the procedure shown in FIG. 4), and the announcement of this buyer's IP address block is changed from one Seller to another. In reality, although the set-up configuration can be done within minutes by the IP Exchange itself, this process is not instantaneously achieved since it takes up to 2 days for the routes to propagate around the Internet. Hence the actual handover process involves announcing the buyers IP addresses to both the old and the new chosen suppliers. This technique reduces the likelihood of the buyer facing any downtime in changing IP Service provider.

Another previous barrier to making changes from one ISP to another has been Domain Names. When a domain name is hosted by the service provider directly, the site operator faces some difficulty in changing providers. If the site Domain Name Service (DNS) is hosted through the IP Exchange, the site operator has increased flexibility in choosing the ISP through which they actually send their IP traffic.

To facilitate connections from buyers who are currently using standard ISP type functions like Mail backup (to store email that arrives for a server, which may not reach its destination for whatever reason), the IP Exchange may deliver this functionality since it would no longer be available direct from the ISP if they bought IP capacity more advantageously through the IP Exchange. Other services like the registering of Domain Names, and the hosting of the Domain Name Service (DNS) record both Primary and or Secondary, may also be supplied to buyers so as to complete the service offering for them. To achieve this dedicated DNS and mail backup, servers are set up and configured, suitable to match the customer user base, and connected onto different switches onto different routers to enhance reliability and availability.

Buyer with an Autonomous System (AS) Number

This buyer has its own IP Address block and does not need to receive one from the IP Exchange. Likewise they are unlikely to need to have domain names hosted. Dealing with an AS customer such as another ISP or major network is slightly more complex.

The communication between AS networks is BGP. Each network would take its own set of connections to other ISP's through peering and transit links, and build a combined BGP route table which is the best routes from all the networks. This situation is not suitable for the IP Exchange, since although it is connected to many (in this, non limiting, example up to 3) networks, it must only share with a buyer, the one seller's routing tables—the ones for the IP Service Provider they choose.

The AS network that buys traffic over the IP Exchange communicates with the IP Exchange AS number using BGP, just as it would another ISP.

To effect a change of supplier, the buyer's VPN is included in the new seller's VPN with its associated Route table assigned. The seller is requested to announce the new buyer's AS number and for a short period of time the customer will be announced by both sellers (old and new). Then after a few days of simultaneous running the announcements can be removed from the old seller's VPN by the IP Exchange, yielding all the traffic through the new network.

An ISP who is also a buyer may typically have an Autonomous System number themselves and hence have their own IP address ranges allocated. Hence the IP Exchange needs to communicate using BGP with the Buying ISP. These abilities are ensured when the IP Trading Exchange is allocated an AS number and its own address range from the relevant Internet bodies such as RIPE (www.ripe.net), ARIN (www.arin.net)

At any point in time, the Buyer's AS is only ever peering with the IP Exchange's AS number and not with the seller network itself.

Further Features and Design Considerations

The ports of the routers can be fully monitored and traffic analysed as to its destination using Cisco's IOS, and Netflow.

In order to avoid installing too many high speed devices in any given router, as a rule of thumb (in existing technologies) there should be one DPT live card and one other card higher than 155 Mbps in any single 7507. Another option could use Gigabit Ethernet cards linking the chassis together. Likewise, care should be taken since only two Gigabit Ethernet cards are usable in a single chassis, even though they do not actually work at 1000 Mbps. Other lower speed cards at 100 Mbps are suitable for connecting on buyers or sellers and also to concentrating switches to enhance the port density capabilities.

In the embodiment of FIG. 3, the key processes are the same as in the single router configuration of FIG. 2. Due to the larger size of the IP Exchange, it is less likely that any buyer will choose a supplier connected to the same router. Hence all connections are made using MPLS VPN between router ports.

In order to resolve some of the memory consumption of storing multiple router tables in the memory of the routers (one routing table corresponding to each ISP), a server may be added running BSD and GNU Zebra. The Zebra server releases some memory on the Cisco Routers by storing the various routing tables associated with each seller VPN. A BSD Unix based server can be set up with GNU Zebra software operating as a Route Server. (http://www.zebra.org/what.html). This can serve the various BGP Route Tables instead of holding them on the memory of the Router, freeing up the router to process the data faster.

Generally, it has been found best to fully configure each router with its maximum memory and processing capability, because the demand on the routers increases rapidly as new buyers and sellers join the IP Exchange.

Though the technology may be scaled so that Exchanges may serve customers in different localities, as a business decision, it may be desirable to maintain the IP Exchange as a local connection service. Leased circuits, fibre, and satellite capacity can all be used to get a buyer to the IP Exchange but they ultimately connect on with a local physical port. A single DPT ring (or multiple meshed GigE connections) may be used to distribute routers around a single city. However, to maintain good relations with the ISP carriers whose services the IP Exchange is brokering, it may be desirable for an Exchange to expand in geographic scope so as to compete with the ISP's. In this model, an Exchange should not become a Network and so will not connect the IP Exchanges as owned and operated network infrastructure.

To provide Exchanges throughout the world, the same Autonomous system number can be used in multiple locations providing there is a different address block that are routed. However it may prove simpler to operate multiple AS numbers.

The IP Exchange may be used by primary carriers to sell their IP capacity directly to end users. Alternatively, the IP Exchange may be used by primary carriers to sell IP capacity to wholesalers, or by wholesalers to sell to end users.

Buyers of IP capacity may obtain low prices, to match or beat market rate, high quality, high flexibility, and capacity and scalability to meet increasing demands. The IP Exchange exposes an objective quality measure so that buyers may have an objective basis to compare competing providers. The IP Exchange increases the comparability of different IP products, improving competition and reducing prices. For a seller of IP, the IP Exchange increases exposure to potential buyers. Unused IP capacity can be sold at a competitive price, rather than being left idle and unsold. For sellers, the IP Exchange may also improve the accessibility of buyers to connect to a particular seller's service. The IP Exchange may provide an opportunity for the buyers and sellers to focus objectively on the comparative quality and price of the service on offer when presented in an anonymous format.

In other embodiments, the IP Exchange may be implemented in a more distributed fashion. For instance, a relatively small Exchange may be established in each neighbourhood of a large city, somewhat analogous to a class 4 switch in a telephone network. Each small Exchange may be a single-router (or a single switch) implementation, as shown in FIG. 2, or a larger configuration as shown in FIG. 3. The IP Exchange server would control the behaviour and connections of these small Exchanges. It is theoretically possible, although not preferred, that one carrier may allow a router at the edge of its network to be used as an Exchange for other carriers' IP in return for a fee, much as a local telephone operating company allows its class 4 switches and wire loops to be used by competing local and long-distance companies in return for a fee.

Many buyers wish to connect on using 100BaseT or 10BaseT connections, and these are achieved most cost-effectively using Cisco Catalyst switches. Alternative ranges such as the Extreme Summit range are also good choices provided the Virtual LAN (VLAN) operation is compatible. Highest serial port capacity will be achieved using the Cisco 10,000 router range These Routers all support many interface types—versions,/of Ethernet, ATM, and Serial.

The designs so far discussed with the DPT cards ensure high reliability when fitted with dual power, sufficient Router Processor memory. GigE may alternatively be used to connect Routers, most effectively by attaching them to multiple switches such as Cisco 6509.

The IP Exchange may provide the means for the network performance quality of IP Data Networks to be compared by assigning a Quality Index to each network. This largely removes the subjectivity in choosing an IP Data Network Operator with which to connect for transferring IP traffic. Having an independently established Index to benchmark the quality performance of Data Networks enables accurate and meaningful combinations of Quality and Price for IP services to be developed. It also provides IP Data Network Operators with a means to compare their quality performance with that of other IP Data Network Operators, enabling greater understanding of their relative position in the market place. The Quality Index is valuable to buyers and sellers of IP capacity who are interested in more than a mere price factor, assisting them in establishing the real value of connecting to a particular Data Network rather than one of the many alternatives.

The IP Exchange may collect the test data samples from each of many connected IP Data Networks in order to compute a Quality Index. The test data are combined by the application of a specially formulated algorithm to generate an objective measure of the relative quality of each IP Data Network Operator.

Each network may be tested continually at short intervals and the results combined into the Quality Index in real time. The Quality Index for each network may thus be tracked or averaged over a period to provide information on the degree of consistency of quality exhibited.

Figure 5:
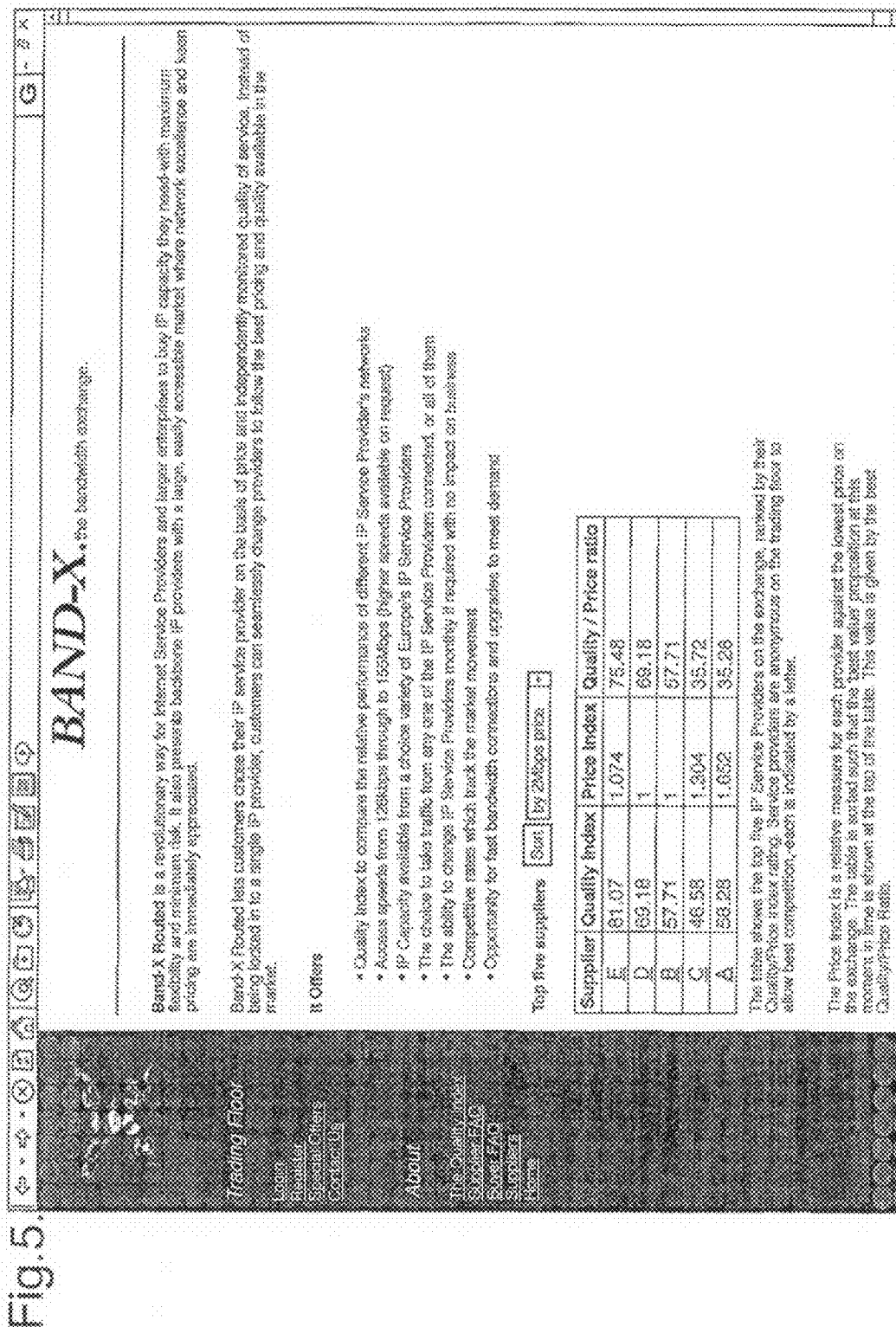
FIG. 5 shows a display of information containing a quality index for 5 suppliers.
Figure 6:
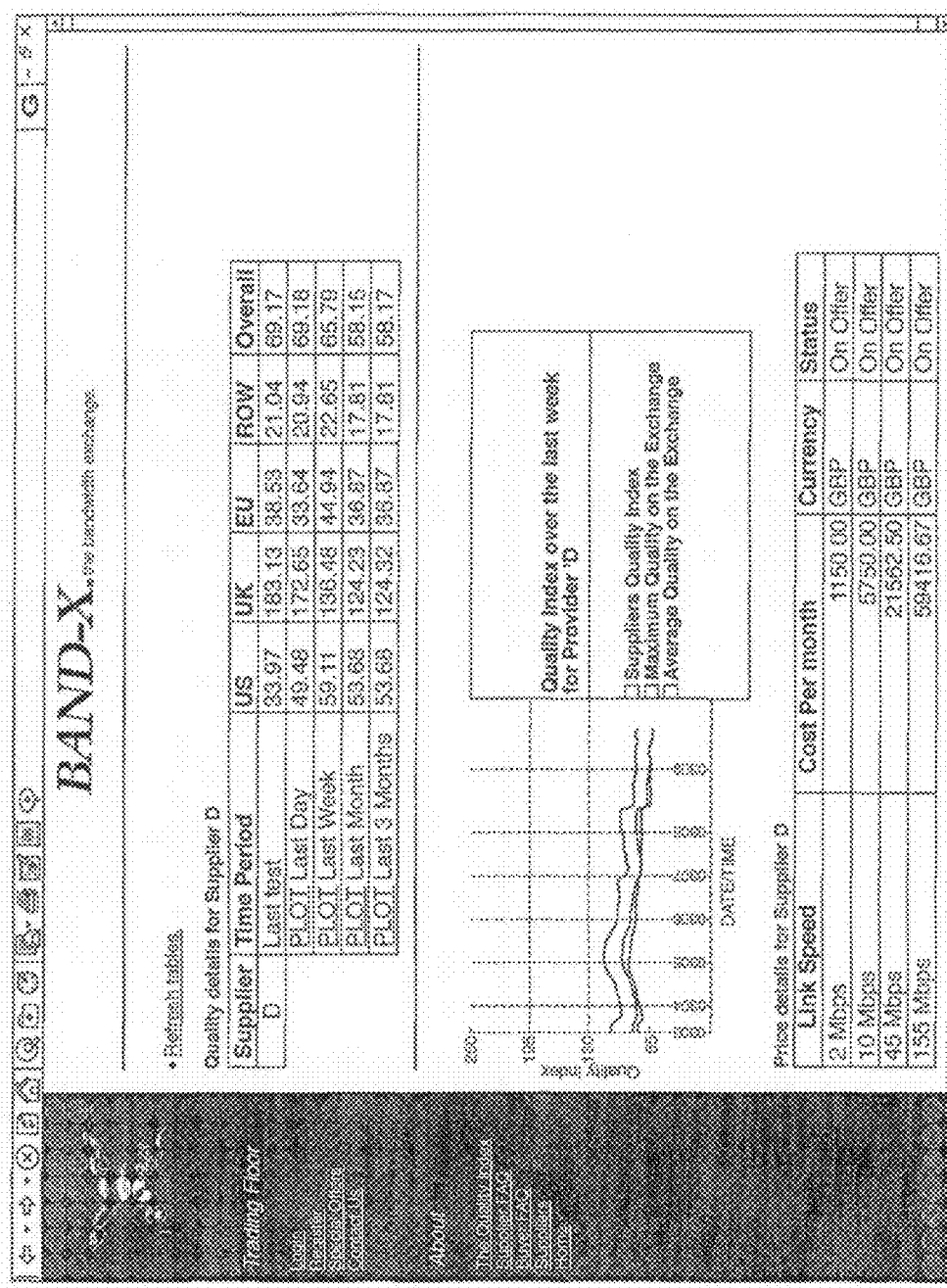
FIG. 6 shows a display of information showing a historical analysis of quality of a supplier.

Referring again to FIG. 5, a screen shot from a web site using the Quality Index shows seven IP Data Network Operators (A, B, C, D, E, F, and G) with their comparisons on network quality and price. Clicking on a letter representing a particular IP Data Network operator takes the user to another table (FIG. 17) showing the way the Overall Quality Index is created out of a Quality Index for each of 4 geographical zones: United States and Canada (US), United Kingdom (UK), Europe (EU) and Rest Of World (ROW). These zones are the broad groups in which traffic across the Internet is described, and hence a given IP Data Network is said to have good "quality" if it has good performance across all zones.

A good quality network would mean that any IP Traffic sent over the Data Networks to Internet Web sites within each of these zones is shown to have consistent, reliable, fast performance with no loss of data and high throughput.

The IP Exchange is physically connected to many different IP Data Networks. Each one is tested using a dedicated Statistics Server located in the IP Exchange (see FIG. 1), attached to each IP data Network with the same interface type in the same physical location—appearing exactly as would a direct customer of that data network operator.

Each Statistics Server runs a program script that collects the data required using industry-recognised metrics. The data is then passed to the central Quality Index Statistics Server and it is here that the data is combined using the Quality Index formula.

Industry Standard Metrics

A number of metrics exist and are used to provide information on individual aspects of a given IP Data Network. Hence in order to be able to create a single measure representing the quality of each network that is readily accepted and understood by those in the industry, a Quality Index may be based on these well known metrics.

A comparison of the performance of different IP Data Networks will be most valid if the data are representative and statistically significant, collected from each ISP's network in a consistent manner. It is also desirable that the overhead applied to each IP Data Network in achieving this Quality Index be minimal, having basically no impact on the usage of that Data Network. The metrics chosen that meet this criteria are as follows:

Ping

This feature of Internet Protocol enables the calculation of Packet Loss from a given point to a distant end host and back by sending known sized streams of ICMP data packets and counting the data returning. This measure is expressed as a percentage (PLOSS).

The ping function also returns a measure of the Round Trip Time (RTT) which is the time taken for the ICMP data packets to travel to the distant end host and return, expressed in milliseconds.

Traceroute

This provides a router by router list of the path taken for ICMP data packets to travel from a given point to a distant end host. In other words it is a count (HOPS) of the number of "hops" or routers traversed to reach a destination host, as well as providing the RIT.

Ping and Traceroute are described in RFC2151 at http://sunsite.cnlab-switch.ch/ftp/doc/standard/rfc/21xx/2151, which (along with all pages referenced either directly or indirectly, by hyperlink or otherwise) is incorporated by reference.

ab.c (Apachebench)

Apachebench measures the data transfer rate (or TRATE) for hypertext transfer protocol (http) traffic between a given point and the distant end host. Since the majority of applications used today have a web based front end, Apachebench provides an appropriate measure of the throughput a user would see to a given web site. Apachebench provides a simple, effective and reproducible means by which comparisons can be made on http throughput.

The code for the metric is freely available over the Internet in source form at http://webperf.zeus.co.uk/ab.c, which is incorporated by reference. Apachebench has been developed by Apache and Zeus (two prominent web server software manufacturers) and compiles on most Unix based platforms. Apachebench works by measuring the data throughput (in kilobytes/second) when repeatedly downloading a file within a specified size range. Many connections are made to a given web site, during each of which tests are carried out to download a particular object. The rate at which the object is downloaded is calculated each time and the best sample taken. The number of samples used in this test is 10 in order to reduce the impact of the sever performance as a factor. As the web server's load and performance can also vary at different times of day, measurements are made at intervals throughout the day in order to get a balanced overall result.

This result gives a direct correlation to the comparative throughput a web user of that site would experience across that network structure.

An alternative industry standard protocol that can be used to provide a measure for throughput is File Transfer Protocol (FTP).

Each of the four variables obtained by the above metrics, Round Trip Time (RTT), Throughput or Transfer Rate (TRATE), Packet Loss (PLOSS) and Number of Hops (HOPS), taken individually, provide a good indication of a network's performance, and the results of continual testing are instructive. However the Quality Index combines the four functions into a single index provides a powerful means for anyone (not just the technical people) to make informed comparisons between IP Data Network operators.

Method of Testing

These four tests are done from a single physical location, to many web sites across the world. Hence the tests measure not just to the limits of a given IP data network boundary, but also its connectivity to the rest of the world through public and private peering, or transit agreements. In other words the test is an end to end test, nearly precisely mirroring a direct customer connection to the Data Network.

The sample of web sites used in the tests is chosen to be representative and unbiased. Considerations to be taken into account may include:
  The IP Data Network to which the web sites are connected, (so as not to be biased in favor of a particular IP Data Network Operator)
  The need to minimize of effect of the server platform itself. This is best achieved by selecting web sites for a variety of industry types
  The geographical location of each web site within each zone
  The overall number of sites tested, compared to the time taken to perform the tests.

The sites selected aim to be fairly representative of the global Internet. Examples of means for finding sites by which to check against the above criteria include:
  Establish the dominant Internet players in the countries within each zone market place. Sites helpful in this:
  UK
    http://www.durlacher.com/fr-pub.htm.
  US
    http://www.barkers.org/online/oc-isps.html
    http://boardwatch.internet.com/isp/summer99/backbones.html
    http://navigators.com/isp.html
  Once the dominant ISP's are clear, roughly equal numbers of web sites are chosen associated with each ISP in the list for each zone.
  Each major peering point in the zone with its own web site should be within the list to indicate the proximity of an IP Service Provider's network to the other players in the industry, in the places where the traffic is most dense Search engines may be used to discover additional sites within different industry types. Search engines may themselves not be used since they may not accept IMP traffic (including Traceroute and ping) and can become over congested and distort results. Web sites of Seller or Buyer connections on the IP Exchange are desirably avoided as this would distort the picture. Where a zone covers many countries, a measure of representation can be achieved within the zone by including web sites located within a major business centre in each influential country.

New sites may be added to the list of index sampling sites from time to time to maintain the representativeness of the sample as new connections are made to the Internet The list of sites is checked periodically against the above considerations, into account. For the purpose of comparing how quality consistency compares for a given IP network over a time period, the list of testing sites is kept relatively stable.

Frequency of Testing

The web sites on the list are tested frequently enough to obtain an accurate representation of the performance over a whole 24 hour period. A Scheduler on the Unix Server governs the interval between samples. This allows for changes to the sampling period without modification of the testing code itself.

The ideal period for scheduling is the time frame taken to complete the tests plus a short rest period. This rest period reduces the risk of missing any data samples, and allows for a congested link that may have got behind to complete the testing before beginning the next scheduled test.

The Quality Index algorithm

This is a formula that combines the independently tested functions to create a single overall value that provides a relative indication of a given network's performance.

In one embodiment, the formula is as follows:

Quality Index=$(TRATE/100) \times \mathrm{EXP}(-(RTT-a)/b) \times \mathrm{MAX}(100-(c \times PLOSS),0) \times (1.05-HOPS/300)$ Where,
  TRATE=Transfer Rate in Kbytes per second.
  RTT=Round Trip Time in milliseconds
  PLOSS=Packet Loss expressed as a percentage
  HOPS=Number of hops
  a=minimum achievable RTT value in ms
  b=$(\mathrm{AVE}(RTT)-a)/\log_e(2)$
  c=weighting numeric placed against Packet Loss to increase sensitivity of Index to Packet Loss Other embodiments may be derived by adding different weighting coefficients on the TRATE, RTT, PLOSS, and HOPS terms, or by combining the terms in different ways. Measurements from different geographical regions may be weighted differently. In some embodiments, customers may be allowed to define their own weighting coefficients, or other combining rules, so that the Quality Index can be tuned to be sensitive to the characteristics of most import to that individual customer.

Objectives for the Formula

The formula is directed to combining the four underlying metrics into a single Quality Index reflecting the data network quality performance to each of the 4 zones; US (& Canada), UK, EU, ROW. The Index should be defined on objective grounds. It should reflect appropriate sensitivity to each of the four constituent elements. Each region should be rated on a consistent basis allowing for the inherent differences in RTT performance for different geographical locations. The indices for each region should be combined into one overall index representing the global performance of that network Construction of the Formula Transfer Rate and RTT operate independently, and may therefore be combined as a mathematical product.

Packet Loss is not independent of the other functions. When it is at its highest—i.e. 100%—no IP traffic can get through the network. In other words the network can be considered unavailable or 'down'. Even a small amount of Packet Loss could present major problems. This typically indicates congestion on the network, which may also result in an increase in RTT and/or a reduction in the Transfer Rate.

Combining the rating factor for Packet Loss with the other factors one could attempt to remove any correlative effect, which amplifies the reduction of the Quality Index. However, this would complicate the algorithm significantly and in practice this effect is not unwelcome.

It is recognised that the number of hops is not a direct determinant of quality. Nevertheless since fewer hops means fewer opportunities for failures, data corruption or loss it is clearly more beneficial to have as low a number as possible. However it was decided that the impact of the number of hops should have a small bearing of up to +/−5% on the overall Index.

Transfer Rate (TRATE)

Factor that contributes to the Quality Index is:

(TRATE/100)

Where TRATE=Transfer Rate in Kbytes per second.

A higher transfer rate indicates a higher degree of performance for a given stream of data, and indicates a superior network quality. It is assumed that a good quality network should be able to deliver the same Transfer Rate to any point within that network. As soon as data is passed off that Data Network, a reduction in the transfer rate would be seen. Hence an ideal situation would be the use of a single network across the world. Clearly this is impractical for the Internet, and so the measure by which the transfer rate is impaired should be directly linked to its impact on the Quality Index.

In this way this metric provides an indication of the connectivity of the Data Network with other IP Data Networks across the Globe through public and private peering arrangements as well as IP transit agreements. Clearly the better managed networks in this regard will deliver the best transfer rate performance.

A direct relationship between Transfer rate and the Index is achieved though the use of a linear scale, where a transfer rate of 100 Kbytes per second is given a rating of 1.0. Higher transfer rates would deliver ratings higher than 1.0 and lower transfer rates lower ratings accordingly.

In the past this metric has often been largely disregarded, with the focus being on pure latency or 'speed' of a network (measured by RTT). However the Transfer rate becomes increasingly more important as applications become concerned with not just the pure speed of a network but its ability to sustain periods of high throughput capacity. An ability to achieve this has the potential for a higher quality than one that does not. With the increasing use of voice applications, video and audio streaming on the Internet, and the interactive sites with high powered graphics, the ability for a web server to serve data extremely fast needs to be met by the ability of an IP Data Network to operate at these high throughput rates.

Round Trip Time (RTT)

Factor that contributes to the Quality Index is $EXP(-(RTT-a)/b)$

Where

RTT=Round Trip time in milliseconds a=minimum achievable RTT value.

$b=(AVE(RTT)-a)/\log_e(2)$

Parameters a and b are determined for each geographical zone separately as described below.

A lower RTT indicates better performance i.e. lower latency means a higher "speed" of an IP Data network. Conversely the higher the RTT the lower the network's performance and hence the lower the rating appropriate towards the Quality Index. The rating asymptotically approaches zero for very high RTT. An exponential decay function can used to model this behaviour, and has the essential flexibility to be adjusted to apply to different geographical sites.

The ideal RTT for a given IP Data Network would deliver the lowest possible latency the geography would allow. In theory one could rate the RTT measured for each web site individually, comparing the RTT achieved with the minimum possible value, due to the physical distance between the geographical locations of the testing site and the host web server for any given web site. This is not a practical option. Furthermore it is desired to provide the quality rating for each of the four geographical zones as well as an overall quality index. The practical approach adopted is therefore to consider each of the four regions separately.

The approach adopted has two elements to consider.

For each region the minimum RTT was determined by considering a large sample of over 10,000 test results generated over a 4 week period. The minimum for each region is given a maximum rating of 1. This minimum achievable RTT for each zone is the parameter a for that zone.

The second aspect taken into account is the rate at which the rating factor should reduce as RTT increases, in other words the profile of the graph for the two elements. Clearly the variation between test results for different sites will be greater for a larger geographical zone. For example, the variation for the UK zone maybe between about 2 and 100ms with an average of around 50 ms, whereas for the ROW the variation may be between 200 and 1000 ms with the average at around 500 ms.

The formula should therefore allow for this increased degree of variation for the different zones in an objectively justified manner, in order that the four geographical zones can be compared on a consistent basis. This is achieved by defining the formula to give a rating of 0.5 at the average RTT observed from the sample data.

Parameter b is then determined for each region using the formula:

$$b=(AVE(RTT)-a)/\log_e(2)$$

where AVE(RTT) is the mean average observed for that region from the sample of over 10,000 test results.

Figure 10:
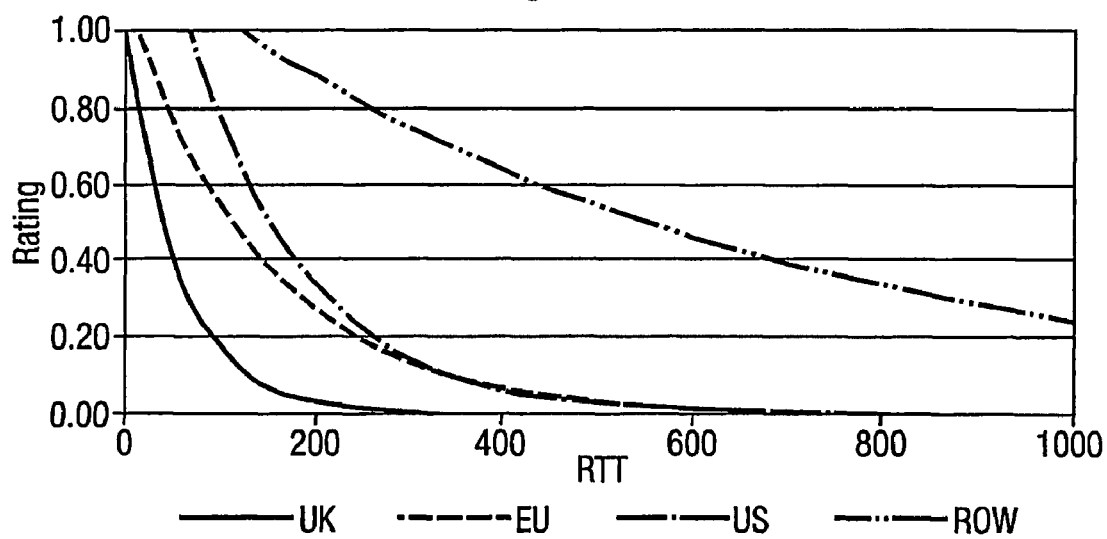
FIG. 10 is a graph relating to quality testing.

As a result the graph (shown in FIG. 10) for the respective zones gets progressively flatter the farther away from the testing location.

Packet Loss

The factor for Packet loss that contributes to the formula is:

$$MAX(100-(c*PLOSS),0)$$

Where

PLOSS=Packet Loss expressed as a percentage c=multiplier chosen to increase the sensitivity of the overall Quality Index to this factor (usually c=1).

This is a fundamental part of the quality measurement, and gives an indication of the congestion on a data network at any instant in time. Expressed as a percentage, the normal instance would be to see 0% Packet loss in a good quality network at all times. Should congestion occur, the amount that the traffic is reduced by should directly affect the Quality Index, such that in the worst case 100% packet loss should deliver a zero Quality Index.

The sensitivity this parameter plays within the formula can be adjusted by assigning a value other than 1 to parameter c. For example, there are some applications that function even if there is some packet loss on a given link, such as regular http web traffic. However an IP voice call transferred over the same link with the same packet loss would be unable to continue.

It could therefore prove useful for a user interested in quality to be able to increase the sensitivity for this parameter. If c=3 for example, this would mean that anything over 33% packet loss would actually return an overall Quality Index of Zero.

In this way, any Data Networks that are prone to packet loss would see their Quality Index drop more dramatically when it occurs.

In practice we found that the effect of the four combined metrics in the formula is sensitive enough to provide a suitable differentiation between Seller's network qualities. Hence we chose to maintain this variable c=1.

Number of Hops

This parameter is defined by the function:

(1.05−HOPS/300)

where HOPS is the number of hops (or routers) traversed to reach a distant web site.

The number of hops traversed to reach a distant web site from a given point is interesting but not a fundamental aspect of the quality of a particular Data Network. That is to say that it is possible to achieve a lower latency (i.e. lower RTT) with a greater hop count if the circuits between the router hops are high capacity.

Nevertheless, it is still important to keep this as a parameter to compare Data network quality for various reasons. HOPS indicates how efficiently the network design has been optimised. Increased hop count increases the likelihood of hardware failure, and packet loss. Generally speaking, networks with higher hop counts are more likely to have lower transfer rates and higher latencies. Certain applications used over IP are sensitive to hop counts. To this end, the Quality Index only allows a variation of 5% increase or 5% decrease in the overall Index. This is achieved by giving a hop count of 15 a rating of 1. Using the Traceroute facility the maximum number of hops that is counted is 30. Hence to achieve a 10% (i.e. 0.1) max variation the number of hops factor needs to be divided by 300.

Host Testing

As noted above, testing is preferably based on a selection of commonly visited domains. However, a user may wish to test specific sites. Preferably a facility is provided to test one or domains specified by a user and optionally providing an option to specify one or more network service providers or to test all available providers. This feature may be provided independently or in combination with other features.

Other Testing Considerations

Because testing for the purpose of measuring the quality index is periodic, short outages may not reliably be picked up. This can be reduced by increasing the frequency of testing, but at a price in terms of resources required for testing and network loading and it is not normally practical test much more frequently than once every 15 minutes or so, which is found to be an optimum frequency in terms of resource requirements and accuracy. However, to alleviate the problem of short outages going undetected, it is desirable to monitor the connection separately, by directly monitoring the connection to the exchange (it will be noted that testing is normally performed by means of a dedicated connection to the seller network, in order to avoid problems of any delays in the exchange itself (or the perception of delays in the exchange)). The quality index may be scaled by this separate, direct, measure of connection, to take into account outages. This may be provided independently. Thus, in a further aspect, the invention provides a method of testing a network comprising periodically, at first intervals, testing the network by means of a connection, preferably a dedicated test connection, to obtain a quality measure, detecting network outages or faults by means of a second connection, preferably a working network connection, substantially continuously or at second intervals shorter than said first intervals and adjusting the quality measure, preferably scaling the quality measure or a component thereof, based on faults detected by means of the second connection.

Different users may have different types of traffic and different assessment criteria. Advantageously, personalised quality metrics can be stored for each user, in which the basic criteria are weighted as desired by a user; this feature may be provided independently. In a further aspect, the invention provides a method of providing measures of quality of a plurality of networks for a plurality users, the method comprising performing a plurality of primary tests on each network (for example ping, traceroute, apachebench) to obtain a plurality of primary quality measures (for example round trip time, number of hops, http throughput, packet loss, latency), storing a set of quality weighting criteria for each user, and providing a quality measure for each user based on the primary measures for each network and the quality weighting criteria for each user. The method may further comprise reporting each quality measure to the respective users.

Provider Inhibition

It will be noted that an important feature is that a user is connected only to a selected (one or more) provider even though the connection centre has the physical capability to connect that user to other providers and in some cases a route via an unselected provider may be faster, more direct or more reliable than a route via a selected provider. However, this ability to inhibit otherwise available routes is an important and advantageous feature which may be provided independently.

Billing Considerations

Billing may be achieved by initially noting the selected tariff and fixed initial period, for example a 30 day period, and simply calculating an initial bill based on the known period and tariff for a given agreed rate. Thereafter, the tariff offered by a supplier is monitored and if it is less than the initial rate, the new rate, calculated as a daily rate (or other suitable billing interval), is applied to subsequent days or intervals. Bills are preferably generated at invoicing intervals of a number of billing intervals (for example 30 days, monthly, quarterly). If the rate increases, the user is typically notified and given an acceptance period, for example 14 days in which to select an alternative supplier. After the acceptance period, the new rate is applied.

In the event of a change of supplier, to ensure seamless traffic, the traffic may be migrated live, which means that it may travel via old and new suppliers. However, to simplify billing, the traffic is billed at the old rate and credited to the old supplier for a period covering the migration, ideally 7 days to ensure that all traffic is fully migrated, before switching to the newer (normally lower) rate and crediting subsequent amounts to the new supplier.

Advantageous features of a billing implementation which may be provided independently are:

Usage Samples

On every buyer interface, the usage statistics are preferably collected and averaged over a (preferably about five-minute) period to produce a Megabit per second rate (Mbps). All the samples are stored and used to track usage over a buyer's connection.

Interfaces Capped

Interfaces are preferably capped at the Committed Rate (CR) or the Peak Rate (PR) if the user has a burstable service. This ensures buyers cannot use more than they have agreed to pay for.

CR Billing

The price for a buyers CR is calculated on a daily basis, taking the monthly price on the exchange and producing a daily value. This makes it easy to calculate part months and incorporate modifications when buyers change sellers. If a seller does not offer a price for a certain MBPS rate, then this cannot normally be offered on the exchange.

Fixed Seller Period

If the buyer is in a fixed seller period (preferably 30 days from a new connection date or a change in seller), the price they are charged is the price agreed at the time of quotation.

Price Hold Period

If the price should rise, prices are frozen for existing connections for 14 days, to ensure the buyer has time to make a decision.

Peak Rate

The Peak Rate (PR) should ideally only be a fixed multiple, preferably twice, the CR. (E.g. a 10 mbps CR should only allow a 20 mbps PR).

Burst Billing

If the buyer bursts above the CR, the $95^{th}$ percentile is preferably used to calculate the cost of the burst. The $95^{th}$ percentile is calculated daily, based on all five-minute samples for that given day. If the $95^{th}$ percentile value is greater than the CR, buyers are billed at a ratio of $95^{th}$ percentile to CR rate, and proportion the CR price to reflect this ratio.

An explanation of a suitable burst billing structure and the calculations performed will now be provided.

Maximum Peak Rate (PR)

The PR should only be set at a maximum of desired multiple, typically twice the Committed Rate (CR). For example, a service sold with a CR at 10mbps, should have a maximum PR of 20 mbps.

Interface Requirements

To monitor any bursting service, the buyer must have usage statistics collected on their interface. Failure to set this up will result in an inability to monitor usage and hence charge for bursting.

Calculations

The calculation of any burst usage is done as follows.
  All 5-minute samples for a given day form the population sample that the $95^{th}$ percentile calculation is performed on.
  The $95^{th}$ percentile is a calculation that represents a value of the population at 95 percent, (100% represents the highest value in the population and 0% representing the lowest).
  The $95^{th}$ percentile calculation is complied for each day for the given billing month.
  If the $95^{th}$ percentile on a given day rises above the CR, the buyer has incurred a burst charge. Other wise the buyer is charged at the CR for the given day.
  The burst charge is calculated by taking the $95^{th}$ percentile value and portioning the price for the CR to provide a PR price for the given day. See below.

Example—No burst
  Day X (in month Y)
  CR=10 mbps ($2500)
  PR=20 mpbs
  $95^{th}$ percentile for day X=8.56 mbps (based on the 5-minute sample population for the day)
  8.56 is less than CR
  Days in month Y=31
  2500/31=£80.65 (Daily CR price)

Price for day=£80.65

Example—Burst Incurred
  Day Z (in month Y)
  CR=10 mbps ($2500)
  PR=20 mpbs
  $95^{th}$ percentile for day Z=15.67 mbps
  15.67 is greater than CR, therefore burst charge incurred.
  Days in month Y=31
  2500/31=80.65 (Daily CR price)
  Burst charged=Burst rate above CR/CR*Daily Price for CR
  (15.67/10)*80.65=126.38

Price for day £126.38

Monthly Bill

The buyer's monthly bill is a sum of all daily price calculations.

It will be appreciated that other calculations, intervals, percentiles allowed, sampling intervals and the like may be implemented but the choice of the $95^{th}$ percentile is found to be particularly advantageous from analysis of actual traffic as it allows typical isolated bursts to go "unpenalised" but captures most sustained over use. Use of percentiles in the range $90^{th}$ to $99^{th}$ are considered also be suitable, and these will be more or less "lenient" to a user.

Graphing

Figure 8:
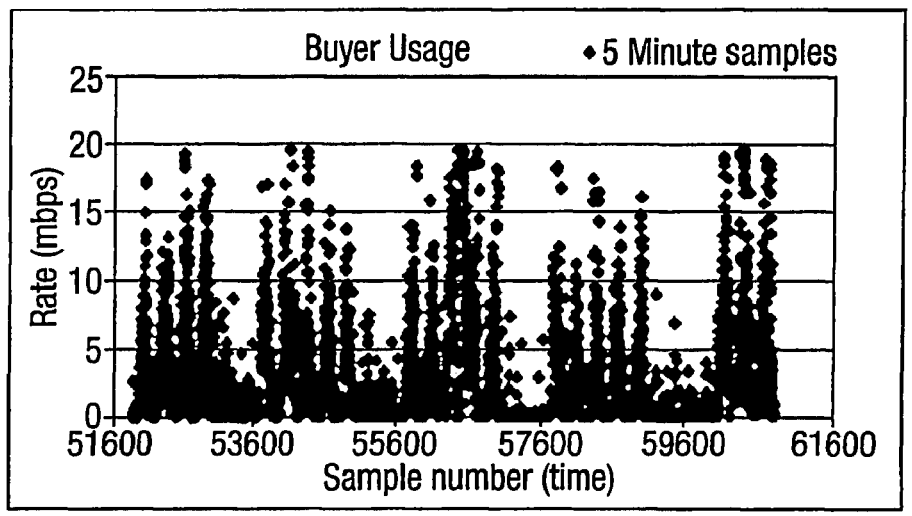
FIG. 8 shows a graph of usage analysis.

FIG. 8 shows a buyers connection for a particular month. Here each 5-minute sample is plotted to show periods when the buyer's usage has gone above their CR (10 mbps) and up to their PR (20 mbps). On the days the CR has been exceeded, the burst charge becomes effective.

Switch Based Connection Centre

Figure 7:
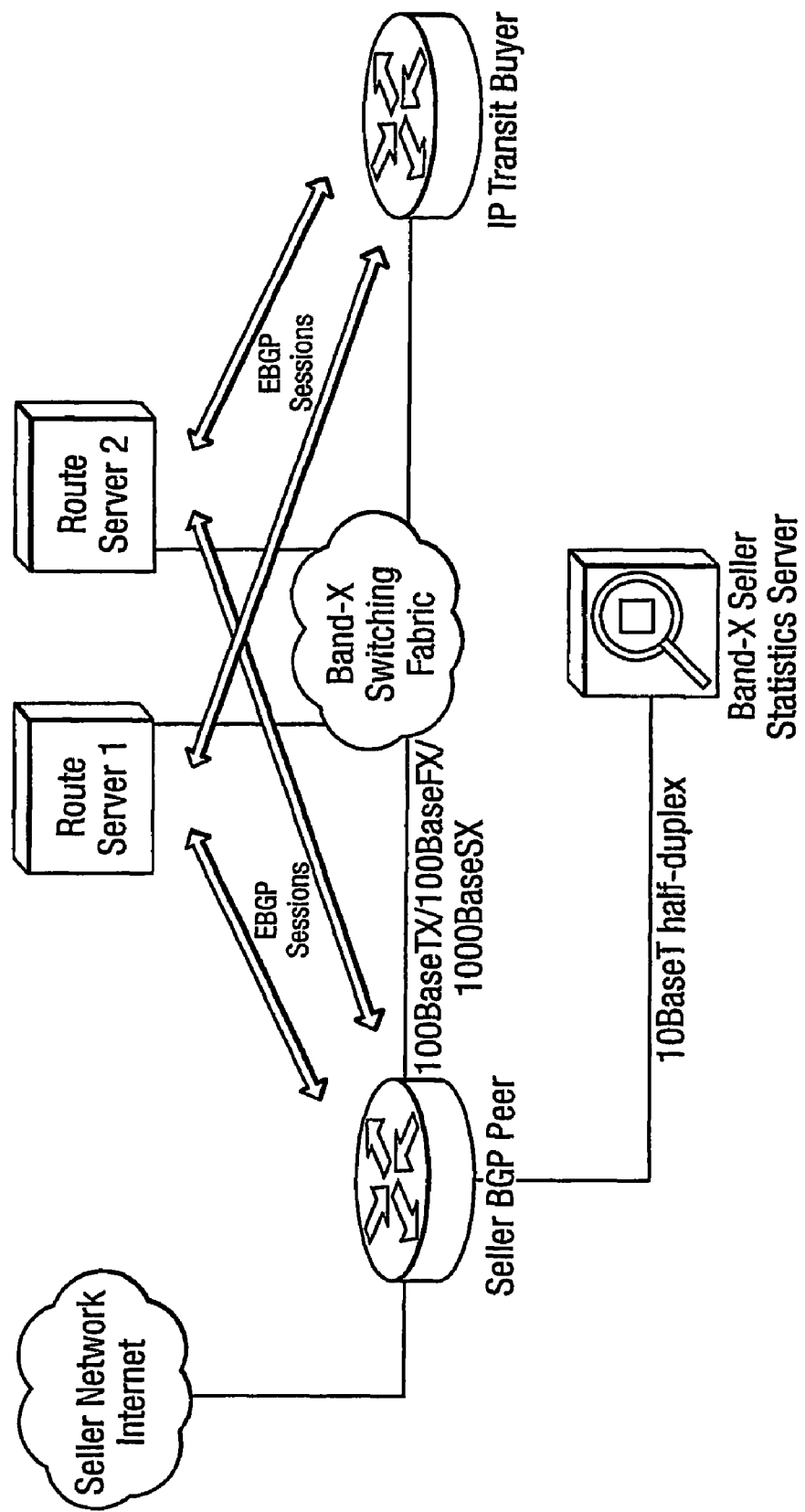
FIG. 7 shows an alternative system configuration.

FIGS. 2 and 3 show a connection centre centred on routers as the routing devices but, as noted above, switches may be used as the core routing device. FIG. 7 shows an overview of a switch based architecture.

In a typical arrangement, the seller (network service provider, ISP) BGP Router belongs to the IP Provider and is typically collocated in the same building or facility as the connection centre, the Band-X Routed IP Exchange.

The Following (Non-Limiting) Definitions are Useful in Understanding the Figure:

IP Traffic Link=Connection between IP Provider(seller) network and IP Exchange for traffic (with the BGP sessions over it):—This connection may typically be GigE, 1000BaseSX or 100BaseFX/TX from IP Provider(seller).

Statistics Server=10BaseT HDX connection for server to run ping, traceroute and ab.c style metrics on (Usage on this link is likely to be very minimal) This is the data from which the Quality Index is calculated.

Requirements:

IP Provider(seller) should preferably assign a/30 Subnet to each of the physical links presented. EBGP sessions presented should be Multi-hop EBGP.

In an alternative configuration of the IP Exchange the IP Provider(seller) may receive an IP address from the connection centre (Band-X) for use with the IP Traffic Link but will still be required to allocate a/30 for use with the Statistics Connection. The EBGP connections in this case may be normal EBGP sessions.

With respect to IP Provider(seller) filtering on BGP routes received from Band-X Route Servers two preferred alternatives exist:
a) IP Provider(seller) uses a RIPE-181 AS-macro object within the RIPE database or RADB etc. which corresponds to announcements made for the particular IP Exchange.
b) IP Provider(seller) will be emailed by the connection centre (Band-X) with each new route announcement when they are required and will then need to manually update the route filter appropriately within a timely manner.
Option a) is preferable but b) is functional and may be preferred if a) is unreliable in certain network configurations.

Figure 9A:
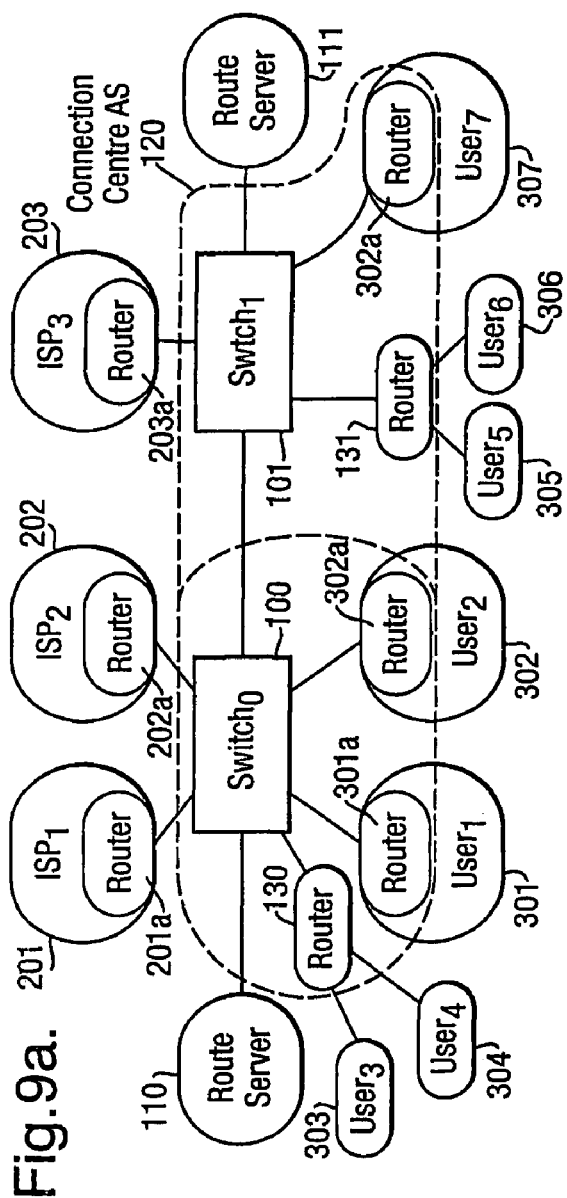
FIG. 9 is a schematic overview of "switch centred" embodiments.

FIG. 9*a* shows schematically a centre having switches 100, 101 as the core with ISP's 201 ... 203 connecting their routers 201*a* ... 203*a* directly to the switches. Users 301, 302, 307 having their own routers 301*a*, 302*a*, 307*a* but which are configured to be within the autonomous system (AS) 120 of the connection centre are connected directly to the switches. Other users 303, 304, 305, 306 are connected via routers 130, 131 to the switches. Route servers 110, 111 provide routing table information for each user. The routing table information for each user may be different (although it need not necessarily be; for example if two users select the same ISP, the routing tables will correspond and in such a case it may be possible to avoid storing multiple duplicate entries). It is preferable for the routers to be within the exchange, to facilitate control, of services.

Figure 11:
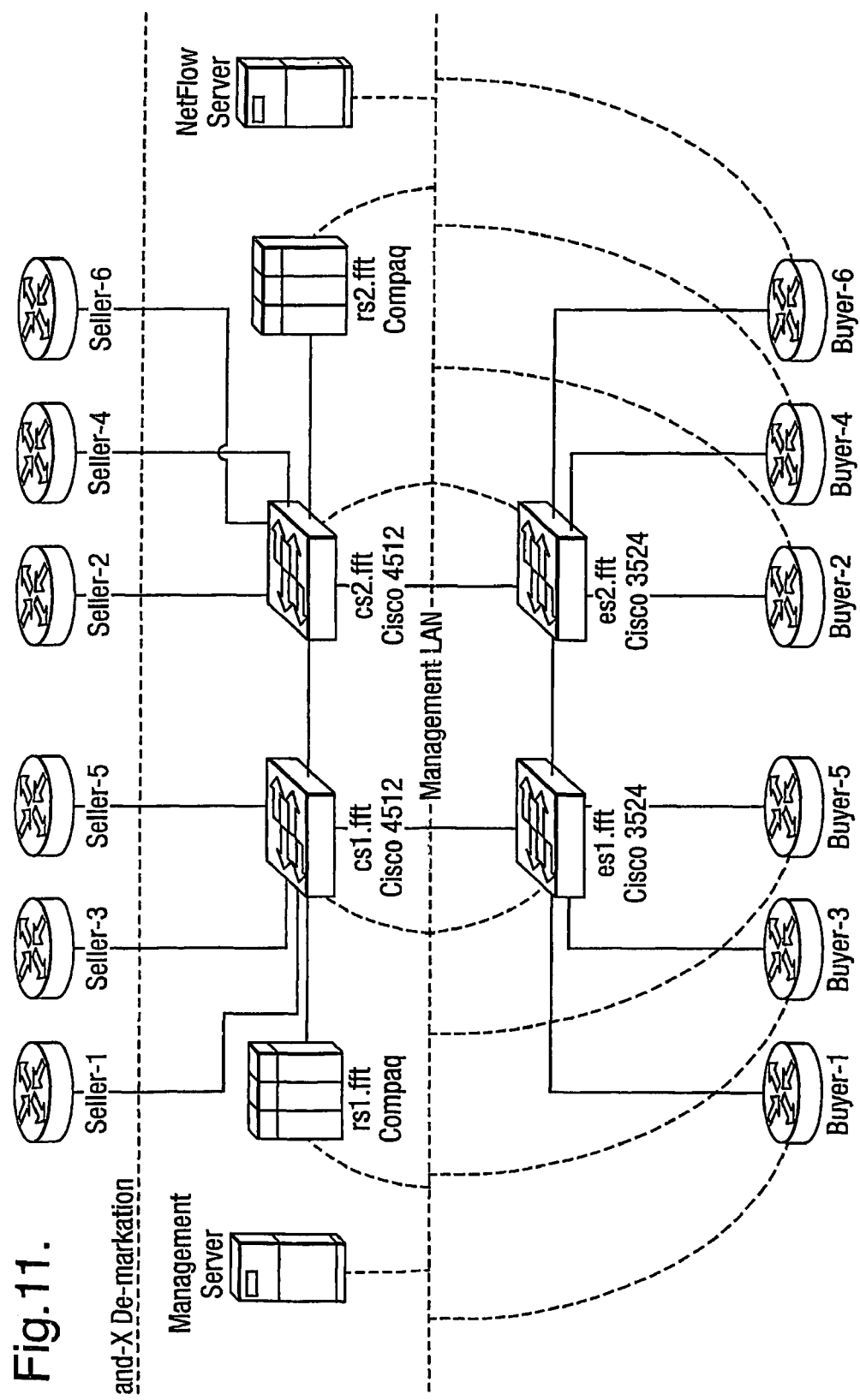
FIG. 11 is a further schematic overview of switch-centred embodiments.

FIG. 9*a* shows a simplified modified arrangement with redundancy in which ISP's, users and route servers are each connected to both of two switches so that if either switch or route server fails, connection can be maintained. These principles may be scaled for more users or ISP's and may be applied analogously to router-centred architecture. FIG. 11 shows a similar system, showing exemplary available components.

Figure 9B:
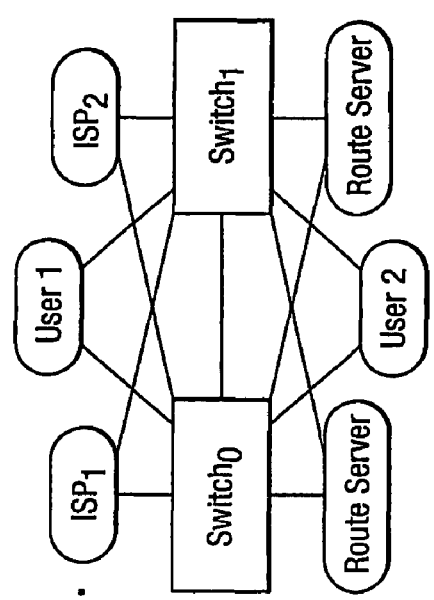

An advantage of the switch-centred architecture of FIGS. 9 and 11 is that migration from one seller to another is facilitated. Furthermore, a user may have a designated instant automatic backup provider. Specifically, a backup network may be arranged to pre-announce the IP address of the buyer, but the switch may simply block traffic from going to the backup network unless the backup condition (e.g. failure of the main network) exists. When switching occurs, since the buyer's IP address has been pre-announced, traffic can flow more smoothly immediately after the switching, without the address having to propagate through the new network. Another advantage is that it is relatively straightforward to arrange connection from one buyer to many sellers, simply by appropriate configuration of the routing table "seen" by the buyer and there can be smooth seamless "soft" handover of routes between sellers.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights.

For the convenience of the reader, this description has focused on a representative sample of all possible embodiments, a sample that teaches the principles of the invention and conveys the best mode contemplated for carrying it out. The description has not attempted to enumerate all possible variations and alternative embodiments are possible. It will be appreciated that many such embodiments are within the literal scope of the following claims, and others are equivalent. The appended abstract is incorporated herein by reference.

The invention claimed is:

1. A method of providing a connection to a distributed network for at least one user comprising:
(a) providing a connection center;
(b) establishing a plurality of connections from the connection center to a respective plurality of network service providers each providing a connection to the distributed network;
(c) storing a database of supplier parameters characterizing each of the network service providers;
(d) transmitting at least some of said parameters for display to prospective users wishing to connect to the network;
(e) in response to a request from a requesting user to connect to the network using at least one network service provider selected from said plurality of network service providers, storing network service provider preference data specific to the requesting user;
(f) establishing a connection from the requesting user to the connection center comprising allocating a block of IP addresses from the connection center to the requesting user;
(g) storing routing data specific to the user based on the network service provider preference data;
(h) in the connection center, routing network traffic between the requesting user and the distributed network via at least one of the network service providers based on the routing data specific to the requesting user and announcing the-block of IP addresses allocated to the user to the distributed network whereby the requesting user becomes a connected user;

(i) modifying network service provider preference data stored for the at least one connected user while the connected user remains connected to the distributed network via at least one of said selected network service providers and wherein the user is initially connected to the distributed network via a first network service provider and following said modifying the user is connected via a second network service provider; and automatically migrating network traffic from the first to the second network service provider and wherein during said migrating network traffic may be routed via either of said first or second network service providers.

2. A method according to claim 1, further comprising repeating steps (d) to (h) for a plurality of requesting users.

3. A method according to claim 2 comprising providing a plurality of user connection points from which connections between the connection center and respective ones of the plurality of requesting users can be established.

4. A method according to claim 1 wherein the network service provider preference data includes preference information for routing data via a plurality of said network service providers wherein the preference information identifies primary and back-up network service providers.

5. A method according to claim 1 further comprising determining at least some of said supplier parameters.

6. A method according to claim 5 wherein said supplier parameters are based both on received parameters provided by the network service providers and determined parameters independently determined.

7. A method according to claim 6 wherein the received parameters include a measure of cost of connection.

8. A method according to claim 5 wherein the determined parameters include a measure of connection quality.

9. A method according to claim 8 wherein the measure of connection quality includes a measure of at least one factor from the group consisting of throughput;
number of hops required to reach a given destination;
packet loss;
round-trip time to and from a given destination.

10. A method according to claim 9 wherein the measure of quality comprises a quality index figure based on a weighted combination of a plurality of said factors.

11. A method according to claim 8, wherein a plurality of measures of connection quality are determined for a plurality of different geographical regional destinations.

12. A method according to claim 8, wherein the measure of connection quality for each network service provider is based on data received from a dedicated network statistics collector coupled to the network service provider's network.

13. A method according to claim 1 wherein step (d) comprises making the supplier parameters available to prospective users over said distributed network.

14. A method according to claim 1 further comprising providing a means of secure access, preferably comprising maintaining a status database and providing at least one connected user with an identifier and password, to enable the connected user to request a change in the network service provider preference data, the method further comprising modifying routing automatically in response to said modification.

15. A method according to claim 1 wherein the connection center comprises at least a first routing device coupled to at least first and second network service providers and coupled to at least first and second users, the first routing device having a first route server for maintaining a list of available routes from the first routing device to points in the distributed network via the at least first and second network service providers, wherein the first routing device is arranged to make available a first subset of the available routes to the first user and a second subset of the available routes to the second user, each subset being selected on the basis of the network service provider preference data for the respective user.

16. A method according to claim 15, wherein at least one of the network service providers is coupled to the first routing device via a second routing device provided in the connection center and at least one of the users is coupled to the first routing device by a further routing device provided in the connection center, wherein the first routing device is connected directly to at least one network service provider and wherein the or each routing device comprises a router.

17. A method according to claim 16, wherein the or each router employs border gateway protocol (BGP) to communicate available routes and wherein the router is configured not to communicate all available routes to all users but to maintain separate lists of available routes for each user.

18. A method according to claim 1 wherein the network service provider preference data comprises a list containing a plurality of specified network service providers.

19. A method according to claim 1 wherein the method further comprises selecting one or more appropriate network service providers or determining the routing data.

20. A method according to claim 19 further comprising automatically reselecting the appropriate network service provider(s) or re-determining the routing data following a change in the supplier parameters.

21. A method according to claim 1 wherein the network service providers are identified to a user by means of a tag (for example a numerical or alphabetical index number) without revealing the full identity of the network service provider.

22. A method of providing access to a distributed network, the method comprising:

providing a connection center;

providing connections from the connection center to a plurality of network service providers each providing access to the distributed network;

providing at least one user connection from the requesting user to the connection center comprising allocating a block of IP addresses from the connection center to the requesting user;

storing a database of supplier parameters characterizing each of the network service providers;

storing network service provider selection criteria;

determining routing information based on the selection criteria and the supplier parameters;

routing traffic from the user connection to the distributed network via one or more selected network service providers based on the routing information and announcing the block of IP addresses allocated to the user to the distributed network, whereby a virtual network service provider is established to provide said access;

modifying network service provider preference data stored for the at least one connected user while the connected user remains connected to the distributed network via at least one of said selected network service providers and wherein the user is initially connected to the distributed network via a first network service provider and following said modifying the user is connected via a second network service provider; and automatically migrating network traffic from the first to the second network service provider and wherein during said migrating network traffic may be routed via either of said first or second network service providers.

23. A system for providing a connection to a distributed network for at least one user arranged for installation in a communication center, the system comprising:
   a connection center for connecting to a plurality of network service providers each providing a connection to the distributed network;
   a database of supplier parameters characterizing each of the network service providers;
   means for transmitting at least some of said parameters for display to prospective users wishing to connect to the network;
   a network service provider preference data store which stores network service provider data specific to a requesting user in response to a request from the requesting user to connect to the network using at least one network service provider selected from said plurality of network service providers;
   means for connecting to the requesting user which allocates a block of IP addresses from the connection center to the requesting user;
   means for storing routing data specific to the user based on the network service provider preference data;
   means for routing network traffic between the requesting user and the distributed network via at least one of the network service providers based on the routing data specific to the requesting user and announcing the block of IP addresses allocated to the user to the distributed network whereby the requesting user becomes a connected user;
   means for modifying the network service provider preference data stored for the at least one connected user while the connected user remains connected to the distributed network via at least one of said selected network service providers and wherein the user is initially connected to the distributed network via a first network service provider and following said modifying the user is connected via a second network service provider; and
   means for automatically migrating network traffic from a first to a second network service provider wherein during said migrating network traffic may be routed via either of said first or second network service providers.

24. A system according to claim 23 wherein the network service provider preference data includes preference information for routing data via a plurality of said network service providers wherein the preference information identifies primary and back-up network service providers.

25. A system according to claim 23, including a statistics server which receives statistics from a plurality of network statistics collectors coupled to at least one respective network service provider's network and compiles a quality index.

26. A system according to claim 23 further comprising means for providing secure access, preferably comprising maintaining a status database and providing at least one connected user with an identifier and password, to enable the connected user to request a change in the network service provider preference data, the system further comprising means for modifying routing automatically in response to said modification.

27. A system according to claim 23 comprising at least a first routing device coupled to at least first and second network service providers and coupled to at least first and second users, the first routing device having a first route server for maintaining a list of available routes from the first routing device to points in the distributed network via the at least first and second network service providers, wherein the first routing device is arranged to make available a first subset of the available routes to the first user and a second subset of the available routes to the second user, each subset being selected on the basis of the network service provider preference data for the respective user.

28. A system according to claim 27, wherein the or each routing device comprises a router and wherein the or each router employs border gateway protocol (BGP) to communicate available routes and wherein the router is configured not to communicate all available routes to all users but to maintain separate lists of available routes for each user.

29. A system according to claim 27 wherein the network service provider preference data comprises a list containing one or more specified network service providers.

30. A system according to claim 27 further comprising means for automatically reselecting the appropriate network service provider(s) or re-determining the routing data following a change in supplier parameters.

31. A system for providing access to a distributed network, the system comprising at a connection center:
   connections from the connection center to a plurality of network service providers each providing access to the distributed network;
   at least one user connection from the requesting user to the connection center comprising allocating a block of IP addresses from the connection center to the requesting user;
   a database of supplier parameters characterizing each of the network service providers;
   means for storing network service provider selection criteria;
   means for determining routing information based on the selection criteria and the supplier parameters;
   means for routing traffic from the user connection to the distributed network via one or more selected network service providers based on the routing information and announcing the block of IP addresses allocated to the user to the distributed network,
   whereby a virtual network service provider is established to provide said access;
   means for modifying network service provider preference data stored for the at least one connected user while the connected user remains connected to the distributed network via at least one of said selected network service providers and wherein the user is initially connected to the distributed network via a first network service provider and following said modifying the user is connected via a second network service provider; and
   means for automatically migrating network traffic from a first to a second network service provider wherein during said migrating network traffic may be routed via either of said first or second network service providers.

32. A system for providing a connection to a distributed network for at least one user arranged for installation in a connection center, the system comprising:
   at least a first routing device for connecting to a plurality of network service providers each providing a connection to the distributed network;
   a first memory area storing a database of supplier parameters characterizing each of the network service providers;
   a processor which is adapted to transmit at least some of said parameters for display to prospective users wishing to connect to the network;
   a second memory area storing network service provider preference data specific to a requesting user in response to a request from the requesting user to connect to the network using at least one network service provider selected from said plurality of network service providers;

a user port which establishes a connection from the requesting user to the connection center by allocating a block of IP addresses from the connection center to the requesting user;

a third memory area storing routing data specific to the user based on the network service provider preference data;

wherein the routing device is configured to route network traffic between the requesting user and the distributed network via at least one of the network service providers based on the routing data specific to the requesting user and announcing the block of IP addresses allocated to the user to the distributed network whereby the requesting user becomes a connected user;

means for modifying the network service provider preference data stored for the at least one connected user while the connected user remains connected to the distributed network via at least one of said selected network service providers and wherein the user is initially connected to the distributed network via a first network service provider and following said modifying the user is connected via a second network service provider; and means for automatically migrating network traffic from a first to a second network service provider wherein during said migrating network traffic may be routed via either of said first or second network service providers.

33. A system according to claim 32 wherein the user port comprises an interface selected from the group consisting of a switch for connection to an Ethernet or a serial connection.

34. A system according to claim 32 wherein the first routing device comprises a switch.

35. A system according to claim 27 including memory storing first and second routing table information respectively for the first and second users and wherein the first user router is supplied with first routing table information and wherein the second user router is supplied with second routing table information.

* * * * *